(12) United States Patent
Laurent

(10) Patent No.: US 11,392,113 B2
(45) Date of Patent: Jul. 19, 2022

(54) SYSTEM ROUTING INTEGRATION THROUGH STRUCTURE WITH EFFICIENT MANUFACTURING INSTALLATION

(71) Applicant: The Boeing Company, Chicago, IL (US)

(72) Inventor: Guillaume Jean-Baptiste Laurent, Media, PA (US)

(73) Assignee: The Boeing Company, Chicago, IL (US)

( * ) Notice: Subject to any disclaimer, the term of this patent is extended or adjusted under 35 U.S.C. 154(b) by 375 days.

(21) Appl. No.: 16/735,966

(22) Filed: Jan. 7, 2020

(65) Prior Publication Data
US 2021/0208574 A1      Jul. 8, 2021

(51) Int. Cl.
  *G05B 19/418*      (2006.01)
(52) U.S. Cl.
  CPC .............. *G05B 19/41865* (2013.01); *G05B 2219/31053* (2013.01); *G05B 2219/31054* (2013.01)
(58) Field of Classification Search
  None
  See application file for complete search history.

(56) References Cited

U.S. PATENT DOCUMENTS 6,496,957 B1 * 12/2002 Kumagai ................ G06F 30/00
  716/112

OTHER PUBLICATIONS

Lin et al., "Efficient Wire Routing and Wire Sizing for Weight Minimization of Automotive Systems," IEEE Transactions on Computer-Aided Design of Integrated Circuits and Systems, vol. 34, No. 11, Nov. 2015, pp. 1730-1741.
Zhu et al., "On the development of a heuristic routing application for the automatic wire harness design in the aircraft," American Institute of Aeronautics and Astronautics, 52nd AIAA/ASME/ASCE/AHS/ASC Structures, Structural Dynamics and Materials Conference, Apr. 4-7, 2011, Denver, Colorado, 9 pages.
Zhu et al., "A KBE Application for Automatic Aircraft Wire Harness Routing," American Institute of Aeronautics and Astronautics, 53rd AIAA/ASME/ASCE/AHS/ASC Structures, Structural Dynamics and Materials Conference, Apr. 23-26, 2012, Honolulu, Hawaii, 10 pages.

* cited by examiner

*Primary Examiner* — Sean Shechtman
(74) *Attorney, Agent, or Firm* — Yee & Associates, P.C.

(57) ABSTRACT

Determining an installation sequence for a system assembly comprising a number of system branches attached to respective terminations is provided. The method comprising receiving schematics for a product into which the system assembly is to be installed, wherein the product comprises a number of openings. A largest termination in the assembly is compared the diameter of an opening through which it is to be routed. If the termination diameter is larger than the opening, an error is generated. If the termination is smaller opening, the diameter of the opening is decremented by a diameter of the system branch attached to termination. The steps are iteratively repeated for the next largest termination in the assembly until an error signal is generated for a termination or all terminations in the system assembly intended to pass through the opening are added as steps in the installation sequence.

24 Claims, 22 Drawing Sheets

SYSTEM ROUTING INTEGRATION THROUGH STRUCTURE WITH EFFICIENT MANUFACTURING INSTALLATION

BACKGROUND INFORMATION

1. Field

The present disclosure relates generally to manufacture, more specifically, to a method for planning on optimal assembly sequence for efficient system routing and installation.

2. Background

The installation and integration of systems, such as electrical systems, is a key element of manufacture for complex products such as aircraft and other vehicles and the development or modification of any products related to them.

the initial design of a product, or subsequent modification, upgrade, extension of the product, requires integration of all systems within the product. The product might contain physical a penetration, hole, or access panel through which a system is required to be routed.

Therefore, it would be desirable to have a method and apparatus that take into account at least some of the issues discussed above, as well as other possible issues.

SUMMARY

An illustrative embodiment of the present disclosure provides a method for determining an installation sequence for a system assembly comprising a number of system branches attached to respective terminations. The method comprising receiving schematics for a product into which the system assembly is to be installed, wherein the product comprises a number of openings. A largest termination in the assembly is compared the diameter of an opening through which it is to be routed. If the termination diameter is larger than the opening, an error is generated. If the termination is smaller opening, the diameter of the opening is decremented by a diameter of the system branch attached to termination. The steps are iteratively repeated for the next largest termination in the assembly until an error signal is generated for a termination or all terminations in the system assembly intended to pass through the opening are added as steps in the installation sequence.

Another illustrative embodiment provides a system for determining an installation sequence for a system assembly comprising a number of system branches attached to respective terminations. The system comprises a bus system, a storage device connected to the bus system, wherein the storage device stores program instructions, and a number of processors connected to the bus system, wherein the number of processors execute the program instructions to: receive schematics for a product into which the system assembly is to be installed, wherein the product comprises a number of penetration openings; identify from the system assembly a largest termination intended to pass through a penetration opening and comparing a diameter of the largest termination to a diameter of the penetration opening; if the diameter of the largest termination is larger than the diameter of the penetration opening, generate an error signal for the termination; if the diameter of the largest termination is smaller than the diameter of penetration opening, decrement the diameter of the penetration opening by a diameter of the system branch attached to the largest termination and adding the largest termination as a step in the installation sequence; and iteratively identify a next largest termination in the system assembly intended to pass through the penetration, compare a diameter of the next largest termination to the decremented diameter of the penetration opening, and further decrement the diameter of the penetration opening until an error signal is generated for a termination or all terminations in the system assembly intended to pass through the penetration opening are added as steps in the installation sequence.

Another illustrative embodiment provides a computer program product for determining an installation sequence for a system assembly comprising a number of system branches attached to respective terminations. The computer program product comprises a non-volatile computer readable storage medium having program instructions embodied therewith, the program instructions executable by a number of processors to cause a number of computers to perform the steps of: receiving schematics for a product into which the system assembly is to be installed, wherein the product comprises a number of penetration openings; identifying from the system assembly a largest termination intended to pass through a penetration opening and comparing a diameter of the largest termination to a diameter of the penetration opening; if the diameter of the largest termination is larger than the diameter of the penetration opening, generating an error signal for the termination; if the diameter of the largest termination is smaller than the diameter of penetration opening, decrementing the diameter of the penetration opening by a diameter of the system branch attached to the largest termination and adding the largest termination as a step in the installation sequence; and iteratively identifying a next largest termination in the system assembly intended to pass through the penetration, comparing a diameter of the next largest termination to the decremented diameter of the penetration opening, and further decrementing the diameter of the penetration opening until an error signal is generated for a termination or all terminations in the system assembly intended to pass through the penetration opening are added as steps in the installation sequence.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
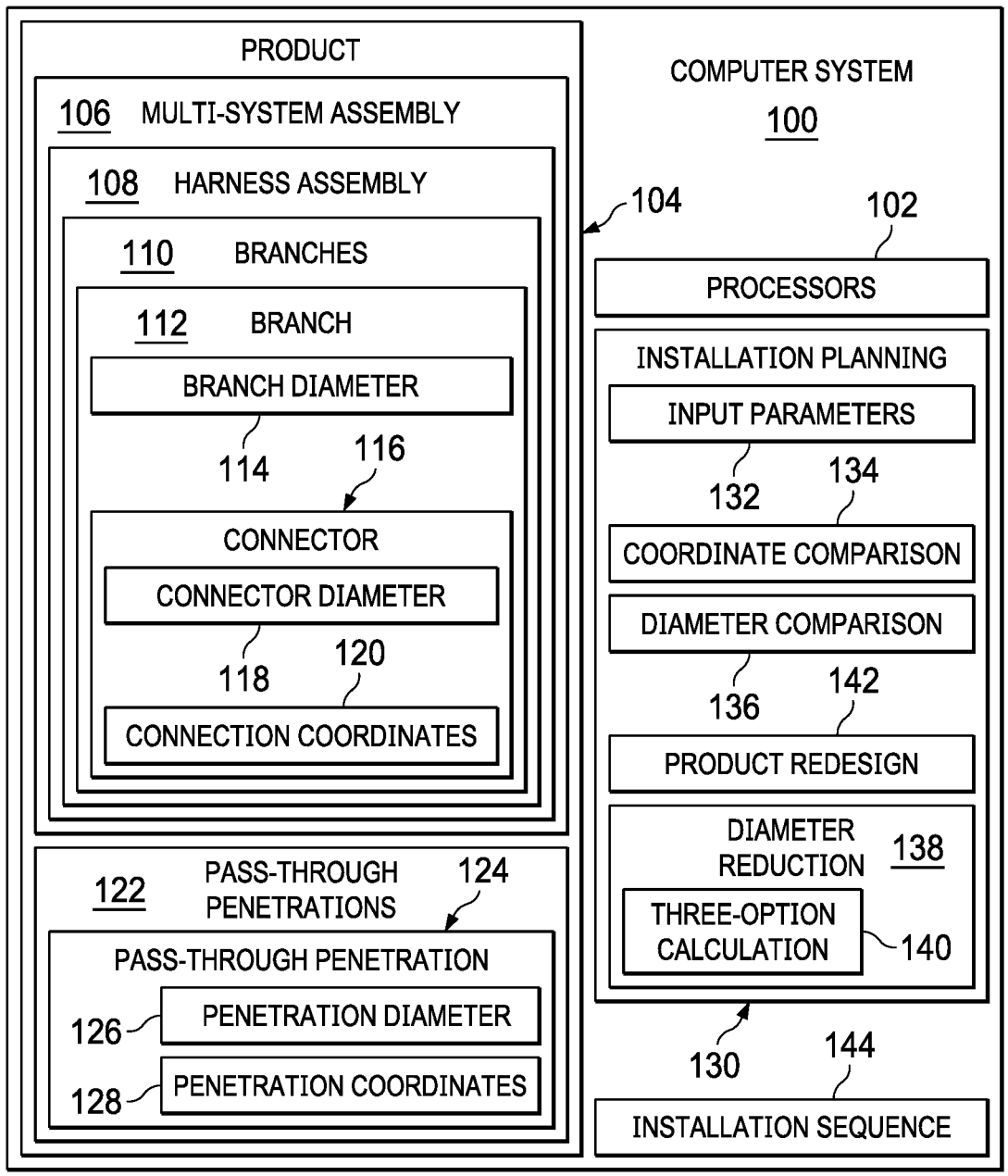
FIG. 1 is an illustration of a block diagram of a system for planning an optimal installation sequence for a multi-system assembly in accordance with an illustrative embodiment.

The illustrative embodiments recognize and take into account one or more different considerations. The illustrative embodiments recognize and take into account that installation and integration of systems such as electrical systems is a key element of manufacture for complex products such as aircraft and other vehicles and the development or modification of any products related to them.

The illustrative embodiments recognize and take into account that the initial design of a product, or subsequent modification, upgrade, extension of the product, requires integration of all systems within the product. The product might contain physical a penetration, hole, or access panel through which a system is required to be routed.

The illustrative embodiments recognize and take into account that no solution has been published covering this topic as an integrated solution. Solution are more likely to be labor intensive, and not published as an integration result. Manual 3D CAD sizing for every possible installation and every structural pass-through penetration is very costly and labor intensive.

For example, Aircraft (old or new) have electrical wiring within them. For new designs or old design that require maintenance, modification, or upgrade of the electrical system, needs to consider the layout of the electrical wiring. Furthermore, with more electrical aircraft and other vehicles, the electrical wiring quantity is increasing, while the space available is not expanding concomitantly. This disparity creates a more complex challenge for the integration and installation of the wiring.

The illustrative embodiments recognize and take into account that in many cases regulations require an efficient system integration ensuring ease of maintenance and ease of removal of wiring harnesses.

The illustrative embodiments provide users a clear understanding of potential problems of a system assembly integration within a product when routing through a penetration or hole. More specifically, the illustrative embodiments can provide a view of potential issues of termination connectors going through penetrations. Illustrative embodiments provide a fast and efficient solution compared to manual labor-intensive analysis.

The illustrative embodiments identify relevant engineering data required to perform an analysis of a planned sequence and calculation of the data to find a solution or concern (including multiple calculation case considerations, based on multiple actual penetration configurations). The illustrative embodiments provide an installation sequence to support the system assembly integration within the product. Current manual solutions rely on each engineer to perform analysis for each system assembly, penetration by penetration, which is time and labor intensive to ensure that each condition is considered. The illustrative embodiments provide a consistent, correct, and quick solution for both design and installation sequence needs.

The illustrative embodiments can be applied to any system designed to physically transfer or transport data, content, or material elements. Examples of such systems include, without limitation, electrical, fiber optic, fuel, hydraulic, water, oxygen, gas, and air. For purposes of the present discussion "system" comprises any system or its related components build as a unit or assembly or defined as an "off-the-shelf" product.

For purposes of the present discussion, an electrical system will be used as an example as it may cover the most complex and flexible system in a product. However, the illustrative embodiments are also applicable to other systems as described above.

For purposes of the present discussion, "system" refers to a system assembly, while it is still applicable to any other system defined as a unit or off-the-shelf product. A penetration or hole or access panel is referred to as a "penetration." The information or data or content or material element, is referred to as "data." The system assembly branch, segment, route, division, subdivision, refers to any location between break out, junction, derivation of the system routing and is referred to as a "system data transfer element". Terminal, end limit, extremity, boundary, terminus, fitting, connector, is referred to as a "termination." The three-dimension coordinates in space are referred to as X, Y, X, but the term is still applicable to two-dimension coordinates. A "final assembly termination" refers to a termination not connected within the assembly or off-the-shelf product prior to final installation in the product.

Turning now to FIG. 1, an illustration of a block diagram of a system for planning an optimal installation sequence for a multi-system assembly is depicts in accordance with an illustrative embodiment. Computer system 100 comprises designs for product 104. In the present example, product 104 comprises a multi-system assembly 106, which might include a number of sub-systems. In the present example, multi-system assembly is comprised of a number of wiring harness assemblies.

Each harness assembly 108 in multi-system assembly 106 includes a number of branches or segments 110. Each branch/segment 112 has a diameter 114 and ends in a terminal connector device 116. Each connector 116 has a diameter 118 and connection coordinates 120 within product 104.

Product 104 might also comprise a number of pass-through penetrations 122 through, which some of the harness branches 110 and their connectors 116 must be routed during assembly. Each pass-through penetration 124 has a specified diameter 126 and associated coordinates 128 within product 104.

Computer system 100 also comprises a number of processors 102 that can execute software instructions to calculate installation planning 130 for multi-system assembly 106.

Installation planning 130 uses details about product 104 and multi-system assembly 106 as input parameters 132. Coordinate comparison 134 compares the starting point and termination point of each branch 114 of each harness assembly 108 in multi-system assembly 106 to coordinate 128 for each structure penetration 124 in product 104. This comparison determines which harness branches and their associated connections have to pass through which, if any, penetrations 122 in product 104 during installation.

Diameter comparison 136 compares the diameter 118 of each connector 116 to the diameter 126 of each penetration through which it must be routed to determine if the connector in question can in fact fit through. Diameter comparison also accounts for the diameter 114 of each harness branch that has already been routed through the penetration in question. This accounting for harness branch diameters is handled through calculating diameter reduction 138 as each harness branch is routed through a penetration. A three-option calculation 140 is used to determine the reduction (explained below).

If diameter comparison 136 generates an error resulting from a connector that will not fit through a penetration, product redesign 142 can be employed to address the problem at the planning stage.

After successful comparison of all branches/connectors with all penetrations through which the must be routed, installation planning 130 produces an optimal installation sequence 144 for product 104.

Figure 2:
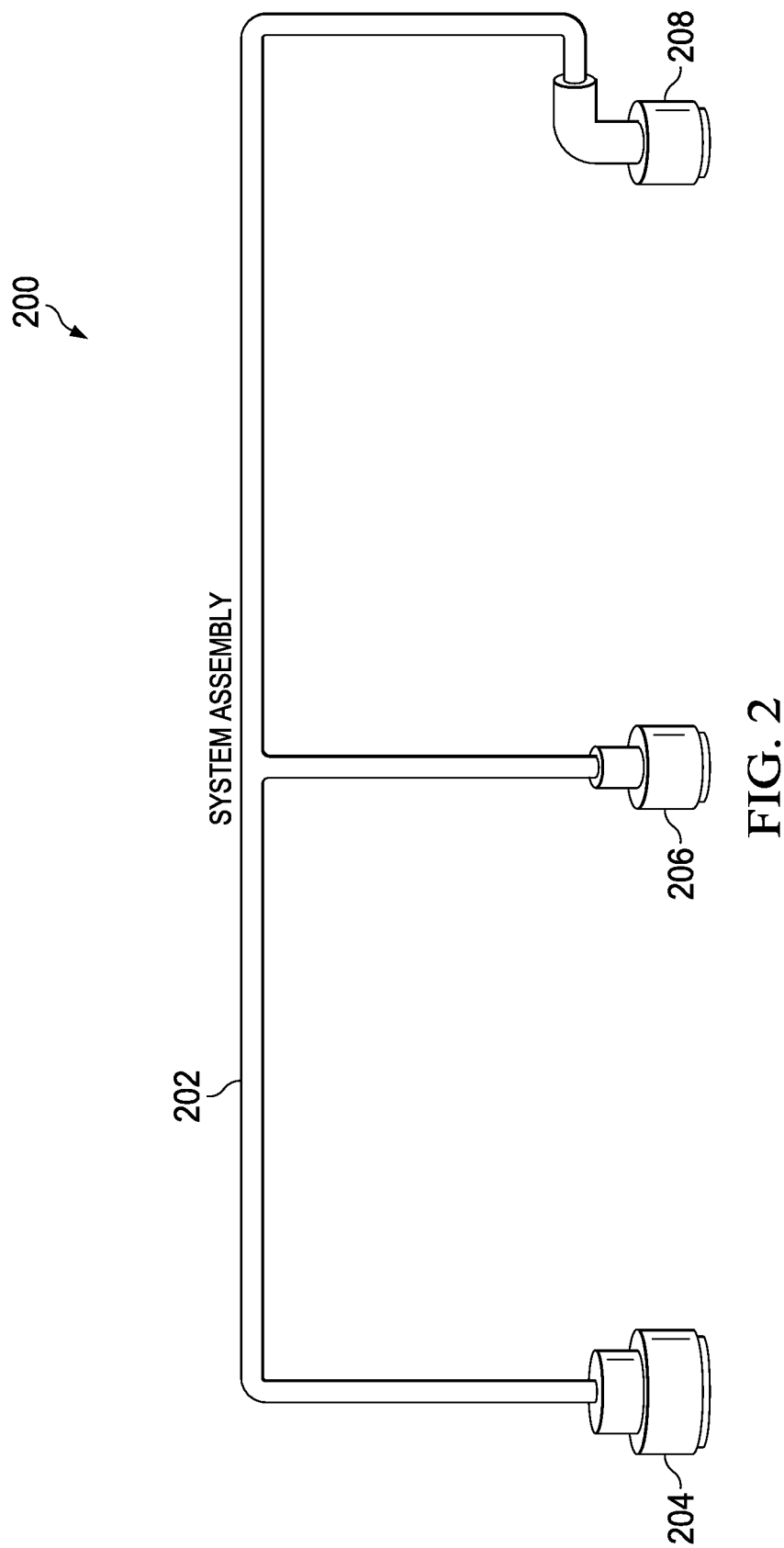
FIG. 2 illustrates an example electric harness assembly with which illustrative embodiments can be implemented.

FIG. 2 illustrates an example electric harness assembly with which illustrative embodiments can be implemented. Harness assembly might be an example of harness assembly 108 in FIG. 1.

Example electrical system harness assembly 200 comprises electrical wiring 202, which serves as a data transfer element, and a number of termination devices 204, 206, 208 (e.g., connector, connector accessory, lug, splices, module, etc.). Each harness assembly is considered as a unit, to be installed within the final product. Harness assembly 200 is a "system assembly" within this example.

The integration of the electrical system requires connection of all terminations of system assemblies to their dedicated termination points, such as equipment or disconnects, in order to complete the product. The integration of the system typically also requires routing and integrating the system harness assembly through "penetrations" (holes) in a product structure.

Figure 3:
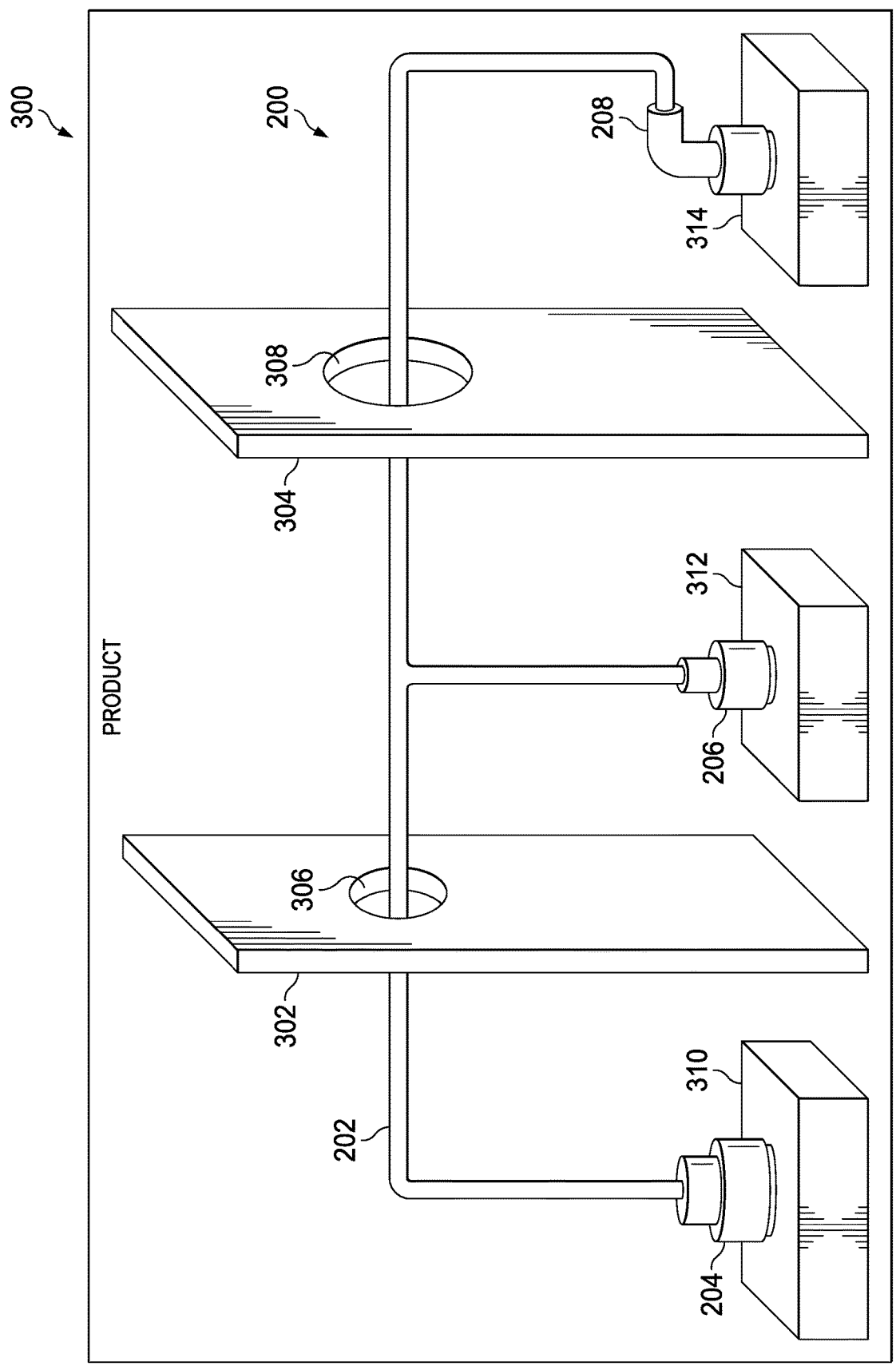
FIG. 3 illustrates an example electric harness assembly in a product with a number of penetrations with which illustrative embodiments can be implemented.

FIG. 3 illustrates an example electric harness assembly in a product with a number of penetrations with which illustrative embodiments can be implemented.

In this example, product 300 comprises two panels 302, 304, each containing a respective penetration 306, 308. In the present example, penetration 306 is smaller in diameter than penetration 308. Product 300 also comprises a number of connection points 310, 312, 314 to which the termination devices 204, 206, 208 of harness assembly 200 can attach.

During manufacture, system integration is more complex when the harness assembly 200 includes termination devices 204, 206, 208 that are bigger in size than the system data transfer element 202.

One of the challenges is to ensure that the system assembly 200 can be fed through each penetration 306, 308 without having a size problem with a termination during installation.

Figure 4:
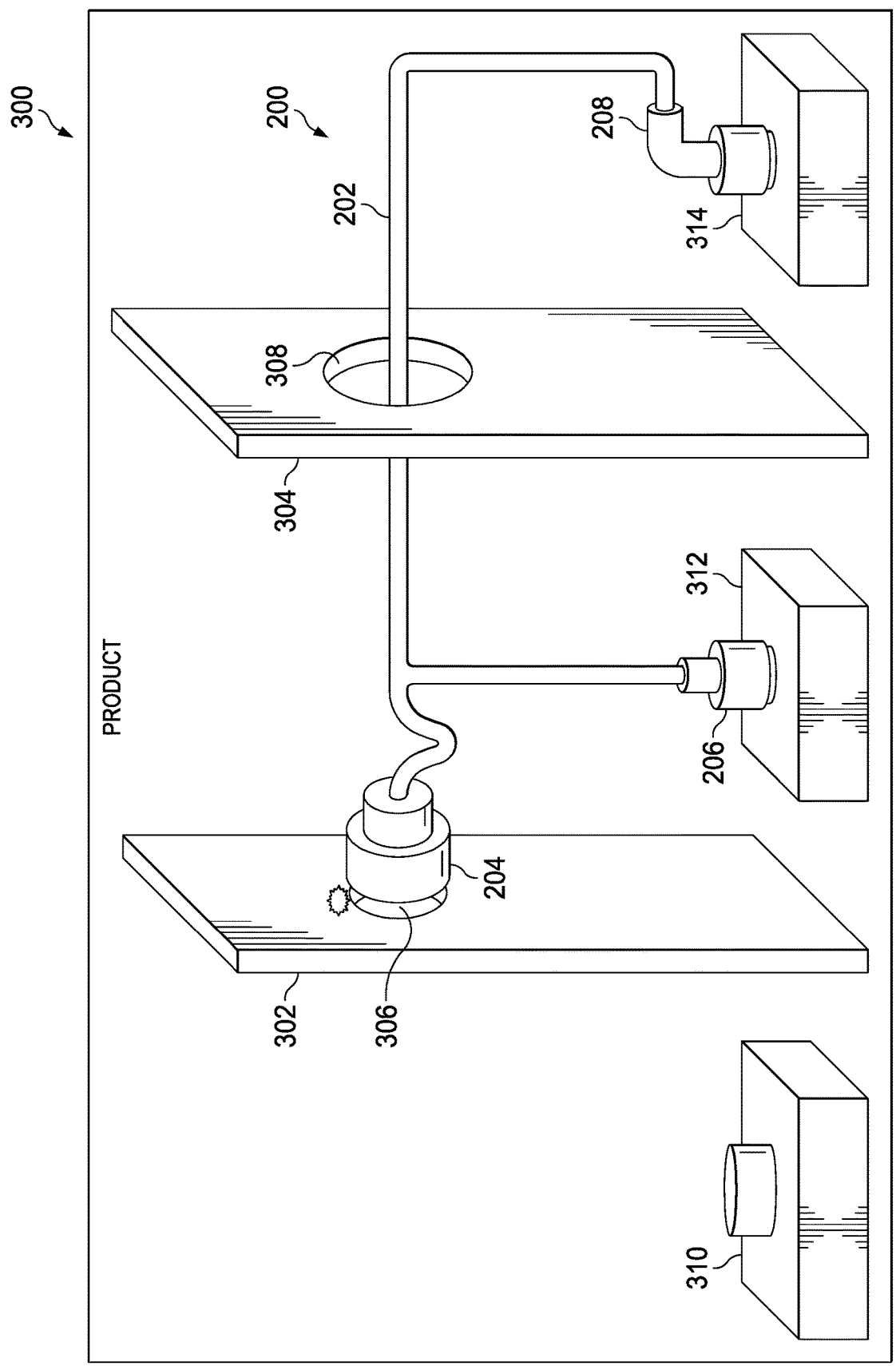
FIG. 4 illustrates an installation problem of a harness assembly resulting from incompatible termination device and penetration diameters.

FIG. 4 illustrates an installation problem of a harness assembly resulting from incompatible termination device and penetration diameters. In this example, the diameter of terminal device 204, which has already been attached to electrical wiring 202 in a prior step, is too large to fit through penetration 306 during installation of harness assembly 200.

Figure 5:
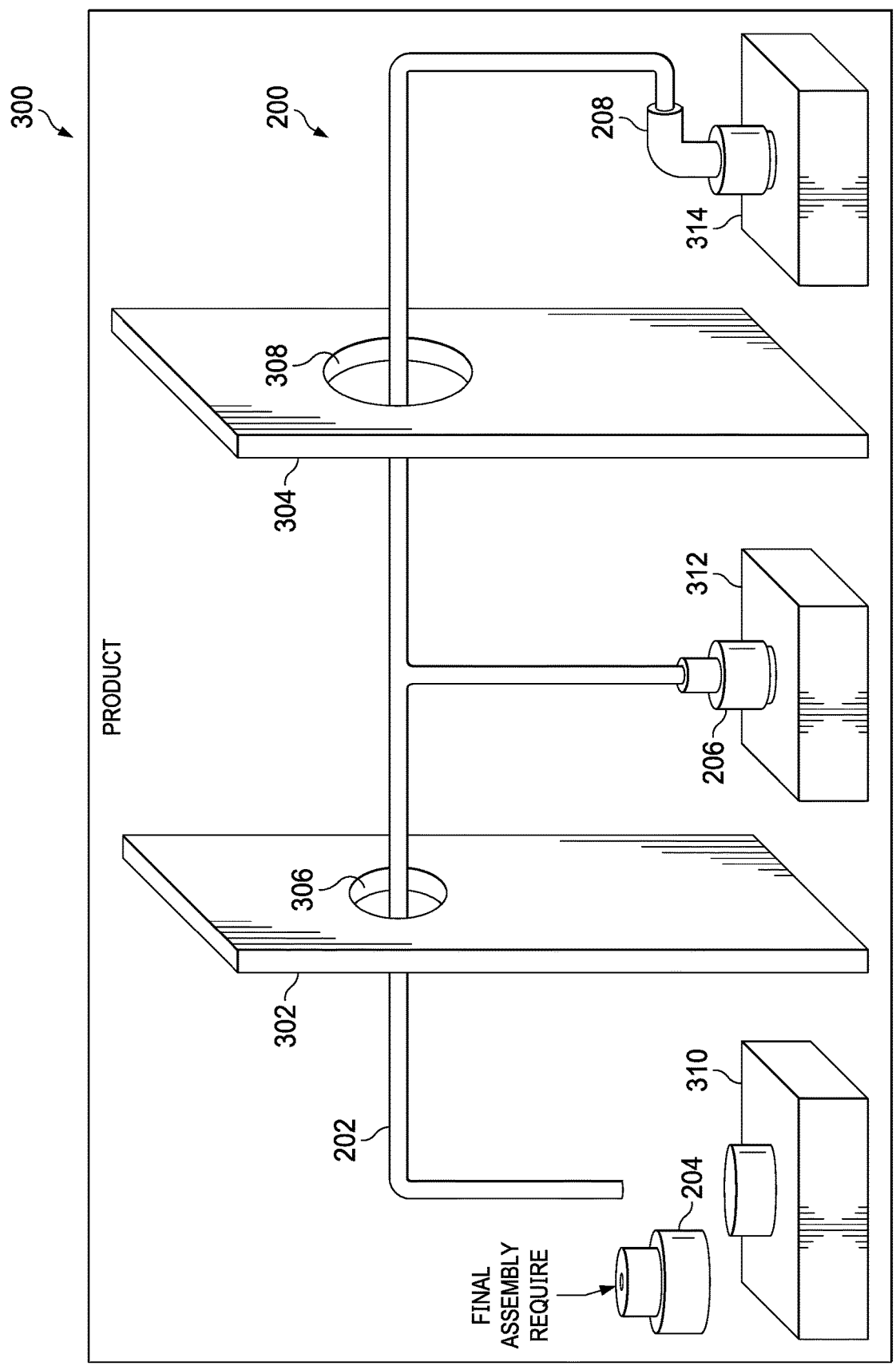
FIG. 5 illustrates an alternative installation sequence of a harness assembly to avoid fit problems in accordance with an illustrative embodiment.

FIG. 5 illustrates an alternative installation sequence of a harness assembly to avoid fit problems in accordance with an illustrative embodiment. In this example, the ideal installation sequence for harness assembly 200 within product 300 comprises feeding the electrical wiring 202 through penetration 306 without the termination 204. The termination 204 is then attached to wiring 202 prior to final hook-up with connection point 310.

FIG. 2-5 illustrate a simple example of how proper installation sequencing can overcome space issues with structure penetrations during system assembly. Such sequencing is rarely considered in manual installation. The potential issues with space constraints in structural penetration are significantly greater with more complex system assemblies.

Figure 6:
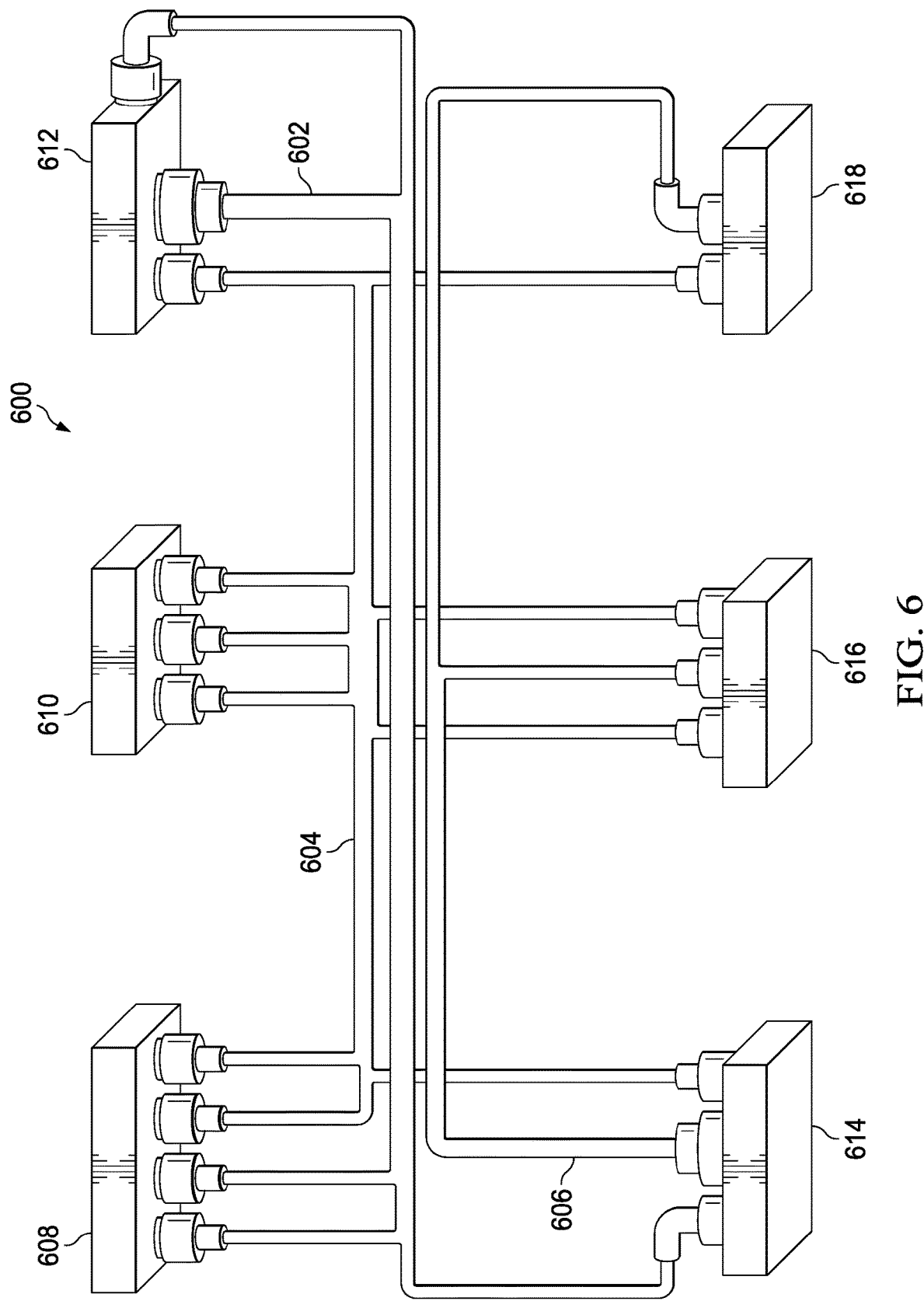
FIG. 6 illustrates a multi-system assembly with which illustrative embodiments can be implemented.

FIG. 6 illustrates a multi-system assembly with which illustrative embodiments can be implemented. Multi-system assembly 600 might be an example of multi-system assembly 106 in FIG. 1.

Figure 15:
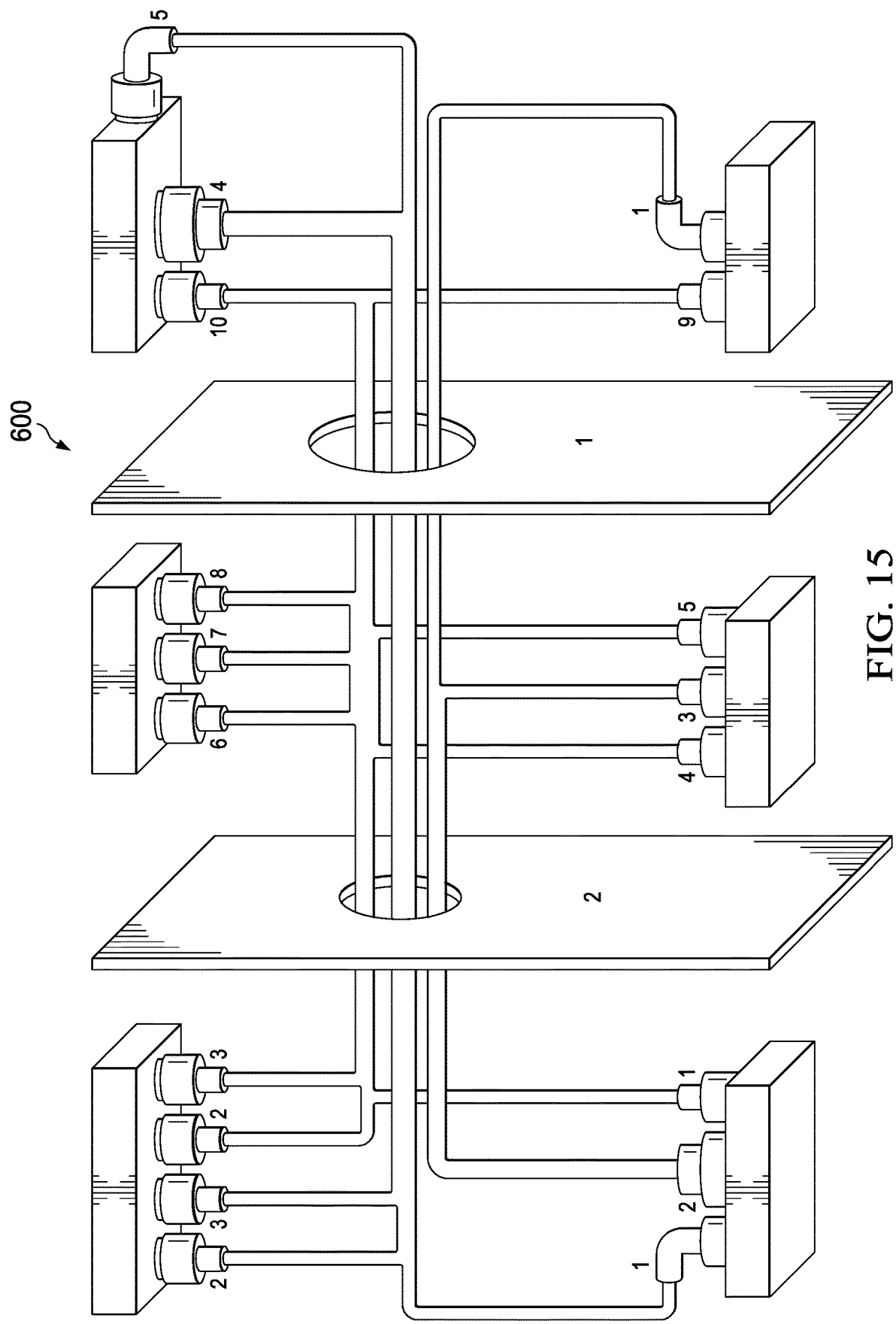
FIG. 15 illustrates a complete installation of a multi-system assembly in accordance with an illustrative embodiment.

Multi-system harness assembly 600 is an example of a more complex system that requires an optimal installation sequence in order to accommodate penetration space restrictions to arrive at a final installed configuration as shown in FIG. 15. In this example, multi-system assembly 600 comprises three harness system assemblies 602, 604, and 606, each in turn comprising multiple branches and termination connectors that connect to equipment 608, 610, 612, 614, 616, and 618.

The illustrative embodiments provide a method for integrating of the multi-system assembly 600 within a product by providing a clear, efficient solution and instruction for the engineering activities and manufacturing in order to increase the ease the product installation. The method approaches the solution from two perspectives. The first perspective provides a pre-calculated throughput of the installation sequence of each system assembly 602, 604, 606 in the multi-system assembly 600 through all related penetrations. The second perspective provides a pre-calculated throughput for a given penetration, with an installation sequence of each related system assembly 602, 604, 606 in the multi-system assembly 600.

The illustrative embodiments provide the technical solution of reducing engineering investigation time or analysis to identify potential installation concerns and determine if a penetration size change is required in advance or if a mandatory final assembly termination is required. For complex products, the illustrative embodiments provide a greater saving in investigation time and determination of a system assembly installation sequence.

The illustrative embodiments help to limit or identify the use of system final assembly termination devices, reducing the manufacturing installation time, labor time, and reliability of the system assembly, and therefore, the final product itself.

Cost savings include reduction of engineering investigation time and analysis time for creation, development, or modification of a system assembly going through a penetration, as well as reduction of manufacturing planning analysis time of the system assembly installation sequence, including creation, development or modification. Furthermore, input data collection can be re-used over multiple products, either new or modified, thereby increasing the cost saving.

The illustrative embodiments also provide the technical solution of avoiding unplanned system assembly installation issues through structures penetration, which can result in last minute rejection requiring change, update, and rework of the system assembly and/or penetrations. The illustrative embodiments help avoid incorrect installation sequences.

A number of inputs for the system assemblies and structural penetrations are used to determine and optimal installation sequence. Examples of system assembly inputs might include system assembly definition (e.g., wire harness assembly), assembly number/name, termination reference designators, system assembly termination reference designator part numbers and associated accessories, termination definition of final assembly, diameter value for branch/segment and relationship with related penetration.

For the structural penetrations in the product, examples of inputs might include unique identification, penetration coordinates (i.e. X,Y,Z), diameter (or equivalent surface area), system/harness number within the penetration, system/harness assembly branch/segment diameter at penetration, and penetration depth.

Figure 7:
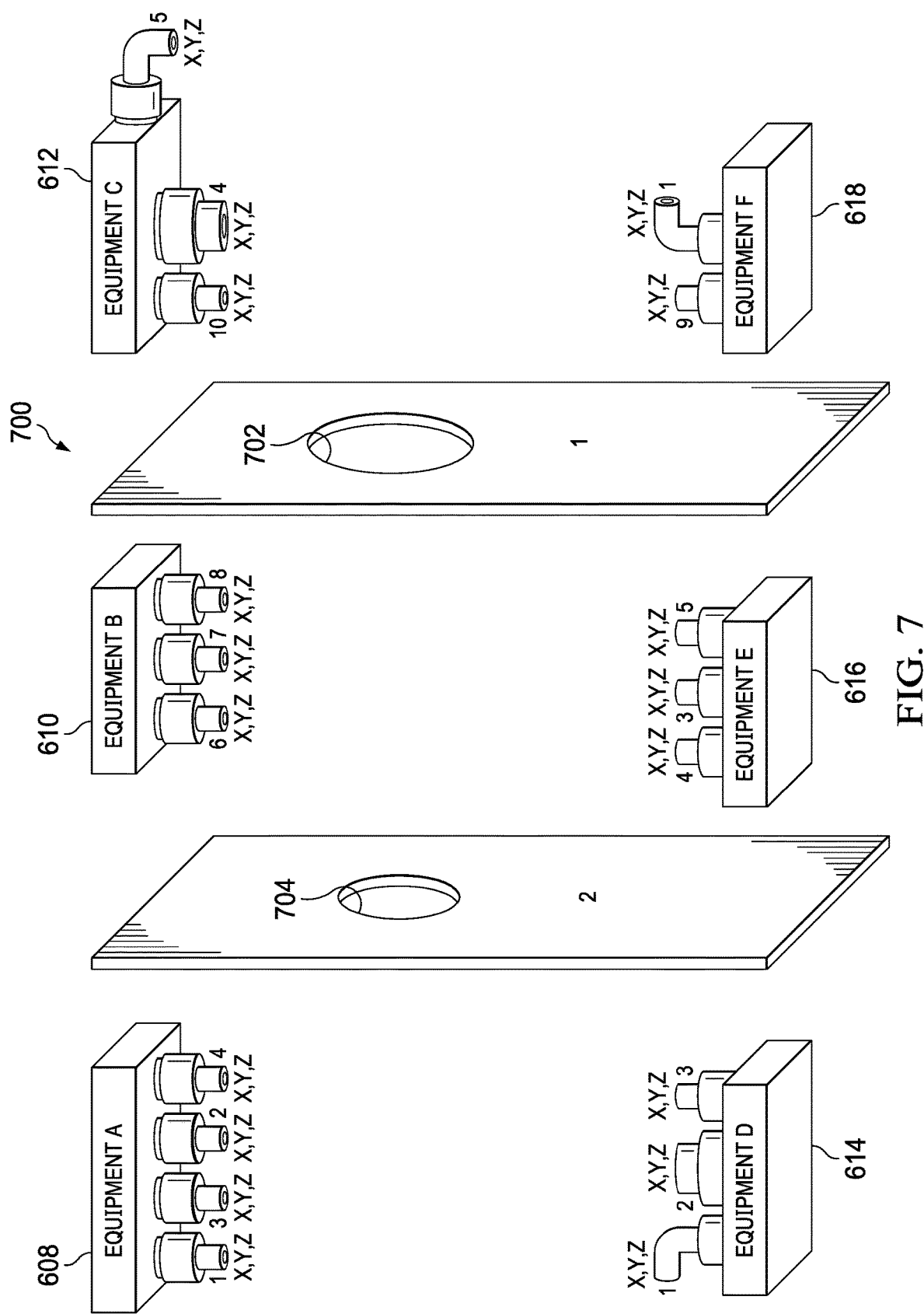
FIG. 7 illustrates a product structure with penetrations into which a multi-system assembly is to be installed in accordance with an illustrative embodiment.

FIG. 7 illustrates a product structure with penetrations into which multi-system assembly 600 is to be installed in accordance with an illustrative embodiment. In this example, penetrations 702, 704 in structure 700 comprise different diameters through which respective branches and termination devices of multi-system assembly 600 are to be fed.

FIG. 7 illustrates all system assembly termination coordinates (X,Y,Z) and expected final locations. Termination part number diameter is defined for installation through penetrations, including accessory elements affecting space such the surface area and shape of the back shell (e.g., straight, 90 degrees, etc.).

Figure 8:
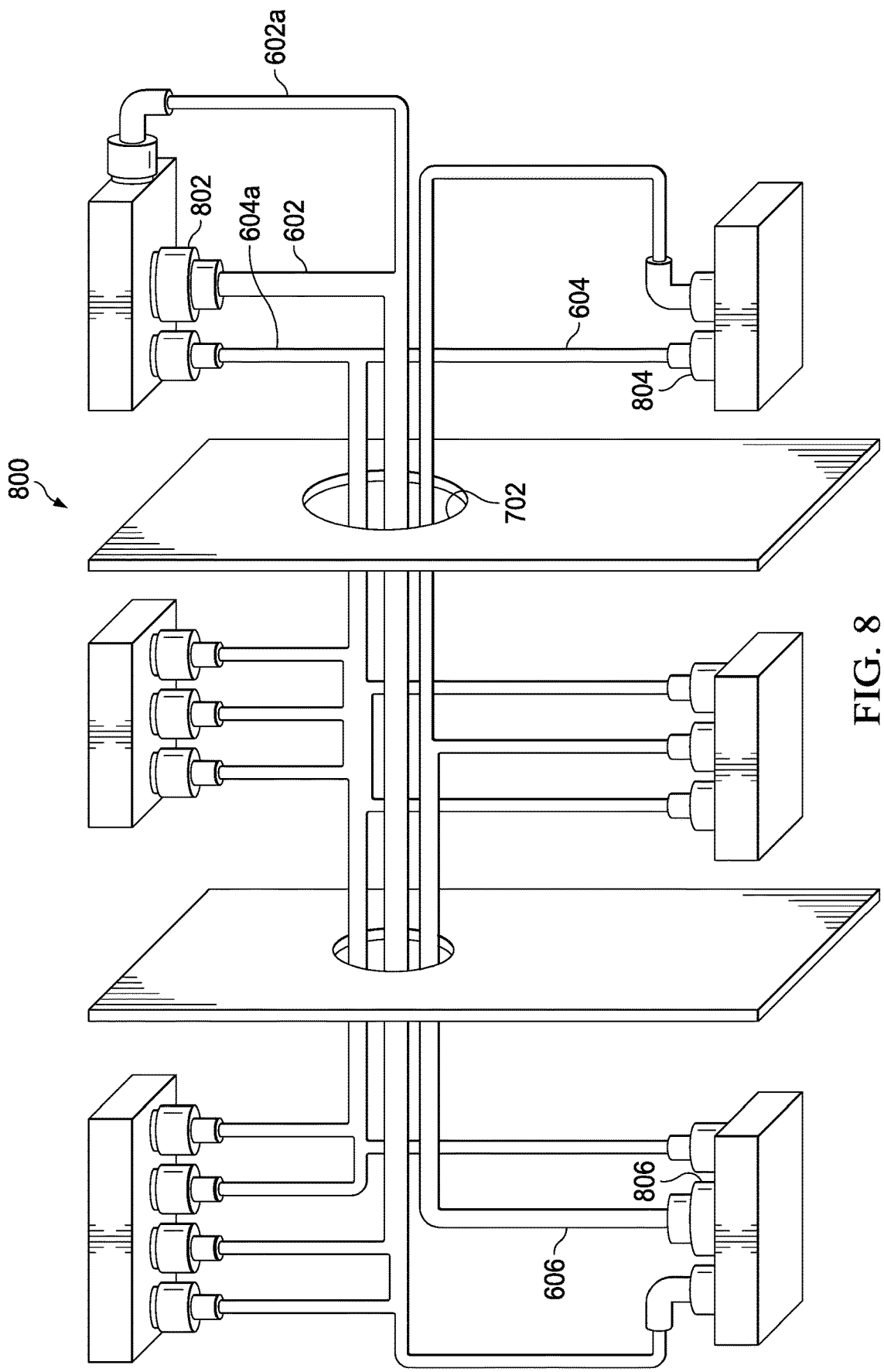
FIG. 8 illustrates anticipated starting points for installation of a multi-system assembly in a final product in accordance with an illustrative embodiment.

FIG. 8 illustrates anticipated starting points for installation of multi-system assembly 600 in a final product 800 in accordance with an illustrative embodiment. For each harness 602, 604, 606, the termination device with the largest diameter (or equivalent) is designated as the starting point of the installation if a specific starting point has not been selected. In the case of a termination device diameter equal to or greater than the data transfer element (wiring) diameter, the termination device diameter can be used for this calculation. In the case of a termination device being added to the data transfer wiring as a final assembly step (after the wiring is passed through the penetrations), the wiring diameter can be used for the calculation. In the present example, terminations 802, 804, and 806 are designated as the respective starting points of installation for each harness.

A list of all termination reference designators can be defined according to harness. For each unique penetration unique identification with an associated harness and diameter number, a unique identification can be created that contains penetration ID, harness number/ID, and termination reference designator number. This information is helpful in determining the starting point.

A data file can then be created containing a penetration ID, penetration diameter, penetration coordinate (X,Y,Z), system/harness assembly number within (fed through) the penetration, termination reference designator and its termination coordinate (X,Y,Z), and system assembly installation starting point location and its related coordinate (X,Y,Z).

The list of termination to consider for the global integration of the product can be reduced by first considering each system assembly wiring branch/segment and its relationship with a related penetration. If information about the branch/segment in question and its relationship with the penetration is not available, it will require an additional manual verification (if a concern is elevated), to ensure that the actual termination device will or will not go through the actual penetration. Such verification ensures that this step is not simply an XYZ coordinate calculation issue. Next, the system assembly installation starting point location is considered and the system assembly termination coordinates for each branch/segment. This analysis will help identify termination connectors that do not have to be fed through a penetration given an identified starting point for the system/harness and can be removed from consideration in determining the installation sequence.

Referring back to the example in FIG. 8, given respective installation starting points 802 and 804 for harness assemblies 602 and 604, harness segments 602a and 604a can be removed from further because they terminate on the same side of penetration 702 as the starting point and therefore do not have to be fed through the penetration.

After this initial reduction of data points for analysis, the next consideration is which system/harness assembly in the multi-system assembly 600 should be the first to be fed through the penetrations in the installation sequence.

Figure 9:
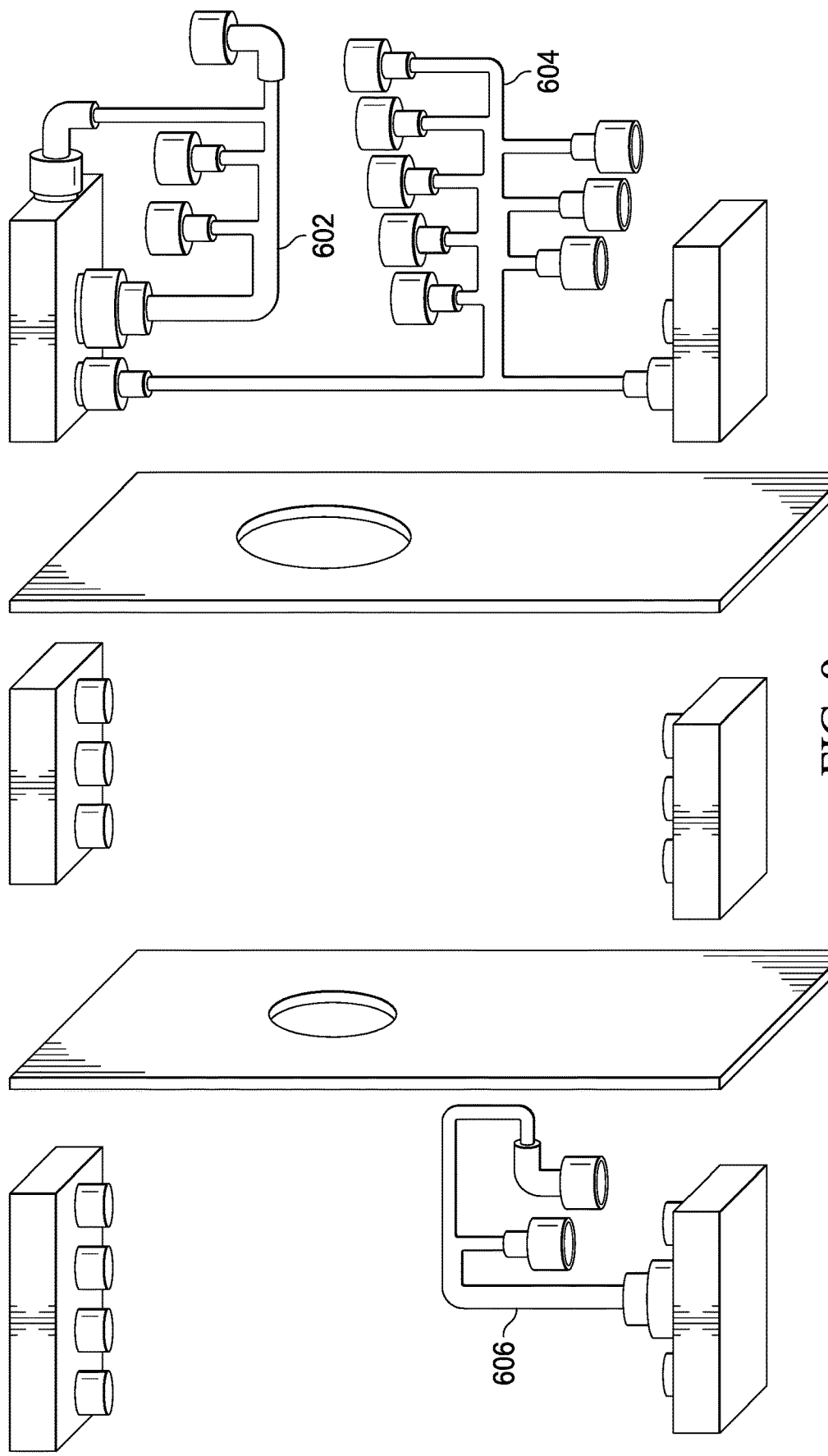
FIG. 9 illustrates an initial installation step for a multi-system assembly in accordance with an illustrative embodiment.

FIG. 9 illustrates an initial installation step for a multi-system assembly in accordance with an illustrative embodiment. At this initial step each system/harness 602, 604, 606 is connected to its respective starting point and any termination points for branches that do not requiring feeding through a penetration.

The harness having the largest remaining termination device diameter is selected as the first to be installed through that penetrations. This selected termination diameter is checked against the penetration diameters and depths.

Figure 10:
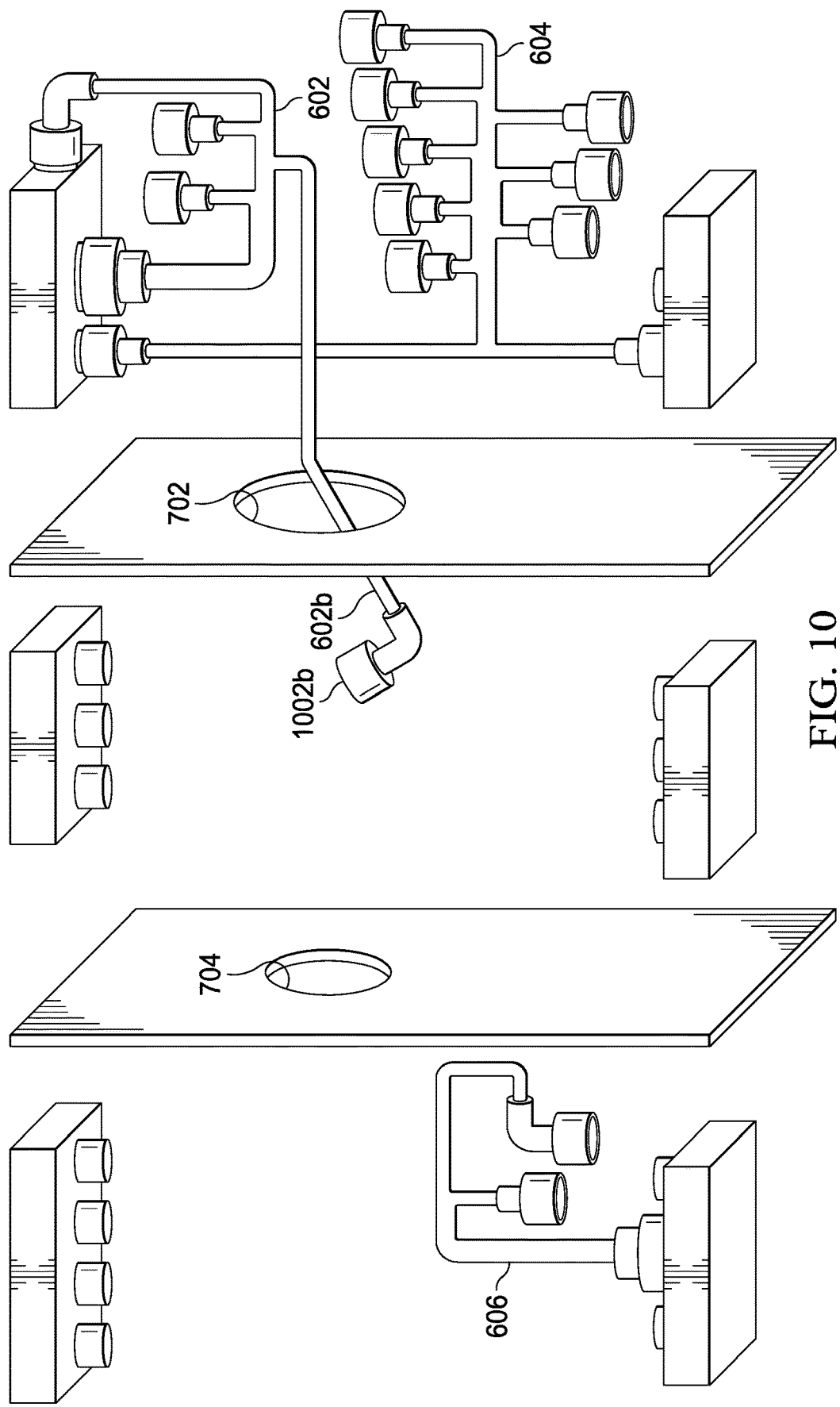
FIG. 10 illustrates a first installation step with the largest remaining connector of a multi-system assembly in accordance with an illustrative embodiment.

FIG. 10 illustrates a first installation step with the largest remaining connector 1002b of multi-system assembly 600 in accordance with an illustrative embodiment. Based on selection of the largest remaining termination device, connector 1002b attached to branch 602b of harness 602 is routed through penetrations 702, 704 first, followed by the remaining branches of harness 602, which have smaller termination connectors.

Figure 11:
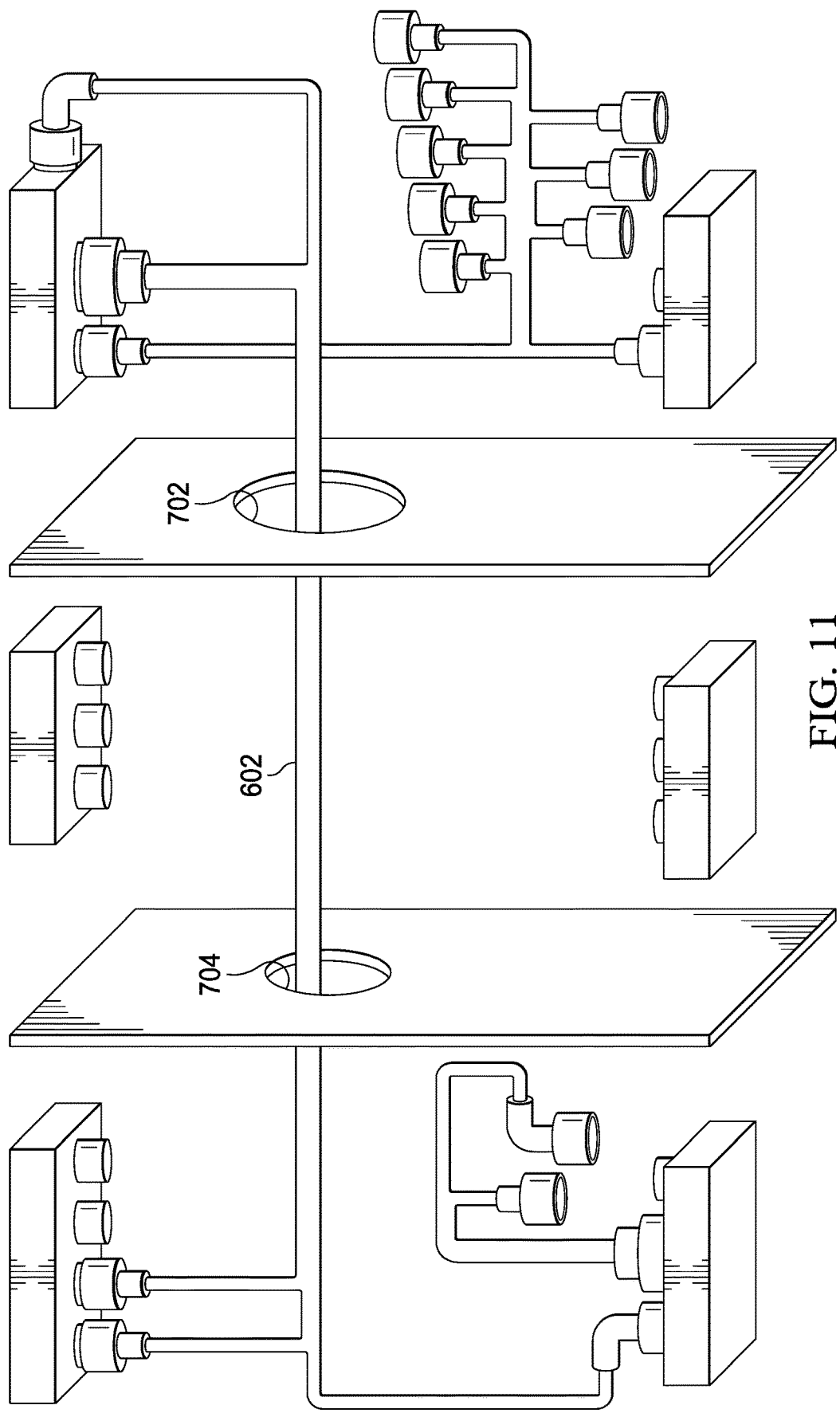
FIG. 11 illustrates a subsequent installation stage of a multi-system assembly with the first harness fully installed in accordance with an illustrative embodiment.

FIG. 11 illustrates a subsequent installation stage of multi-system assembly 600 with the first harness 602 fully installed in accordance with an illustrative embodiment. Installation of harness 602 is then used to calculate the remaining diameters of penetrations 702, 704.

Figure 16:
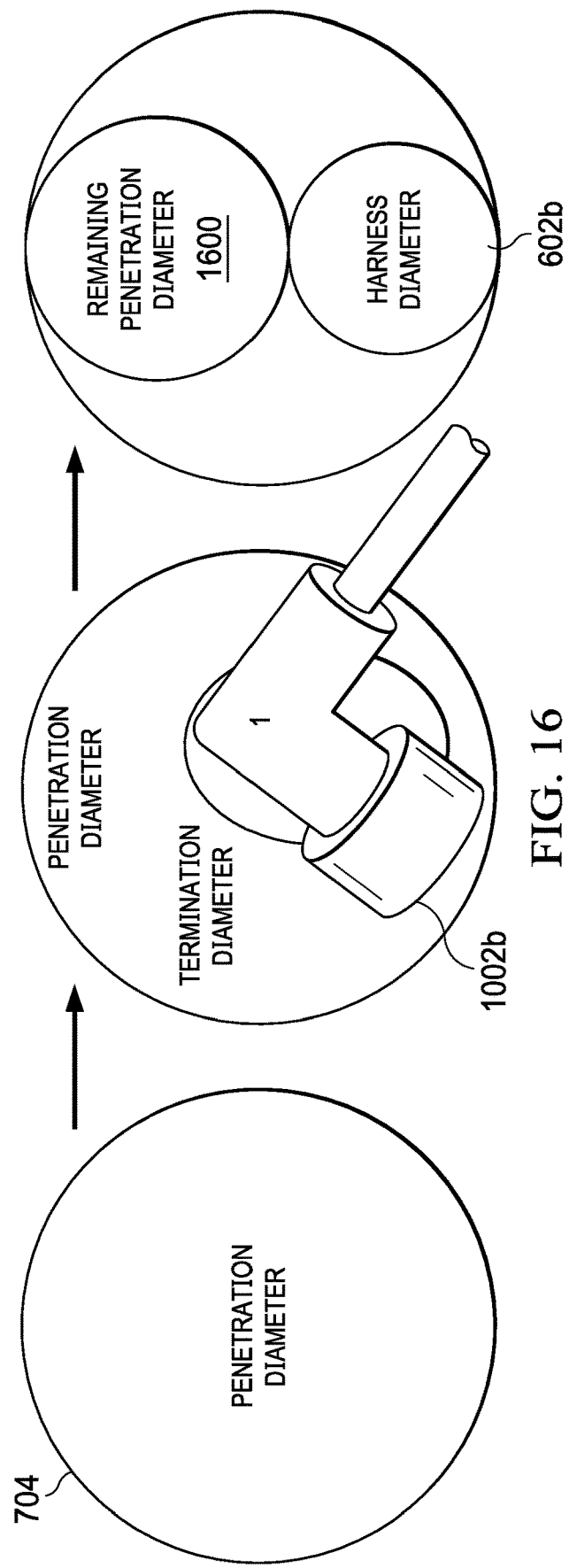
FIG. 16 depicts a visualization sequence for determining remaining penetration diameter after installation of the first harness shown in FIG. 11 in accordance with an illustrative embodiment.

FIG. 16 depicts a visualization sequence for determining remaining penetration diameter after installation of the first harness shown in FIG. 11 in accordance with an illustrative embodiment. In the present example, penetration 704 is shown since it is the smaller penetration. A similar calculation can be made for penetration 702.

Starting with initial penetration diameter 704, after routing of the termination connector 1002b, the wiring for harness branch 602b leaves remaining diameter 1600 available in penetration 704. In this example, considering that harness diameters are round and cannot be squeezed, the remaining penetration diameter 1600=diameter of penetration 704–diameter of harness branch 602b.

This new remaining diameter 1600 of penetration 704 is then used for the second harness 606.

Figure 12:
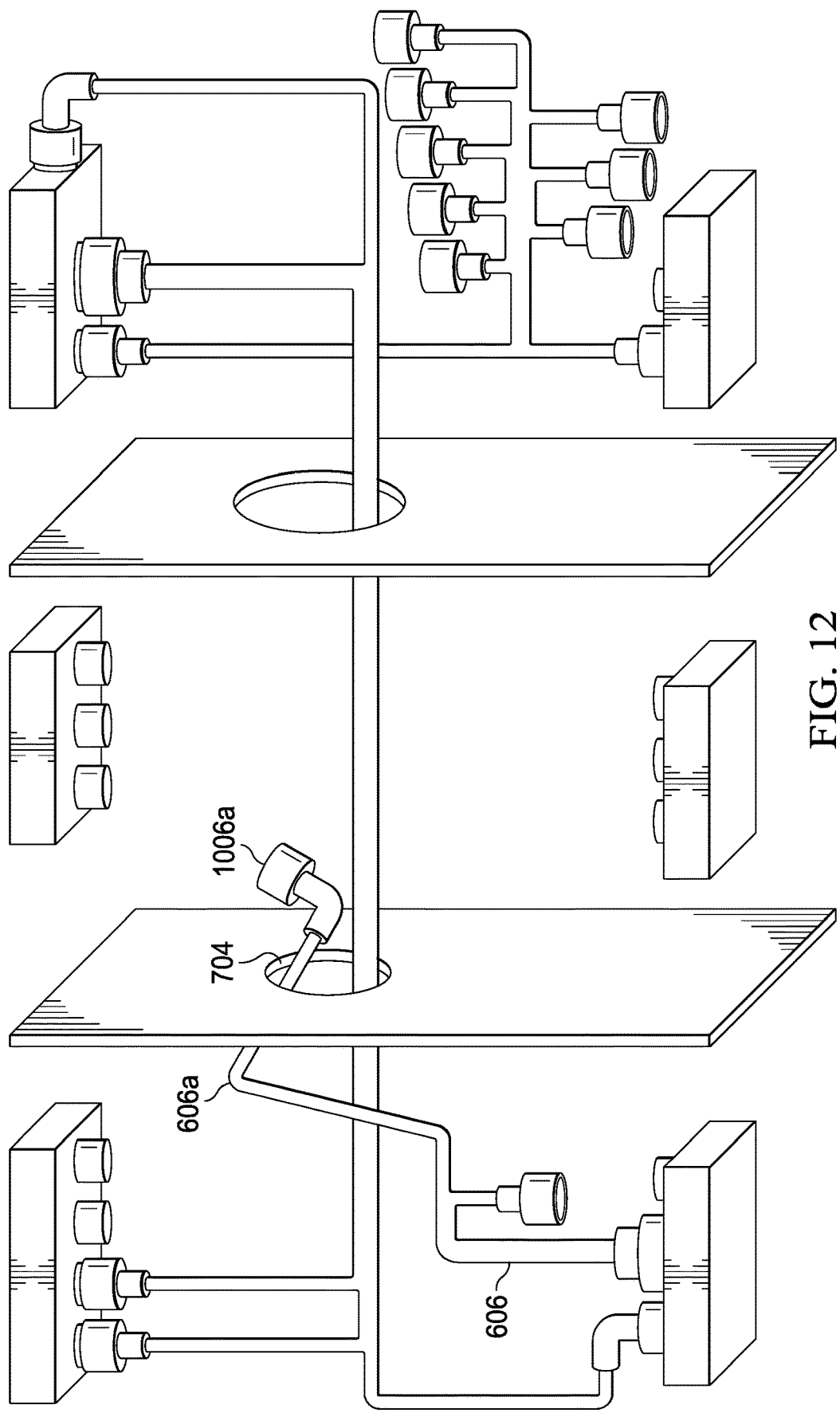
FIG. 12 illustrates a subsequent installation step to begin installation of a second harness of a multi-system assembly in accordance with an illustrative embodiment.

FIG. 12 illustrates a subsequent installation step to begin installation of second harness 606 of multi-system assembly 600 in accordance with an illustrative embodiment. Applying the same principle used with first harness 602, the largest remaining connector, which is now termination connector 1006a, is routed through penetration 704.

Figure 17:
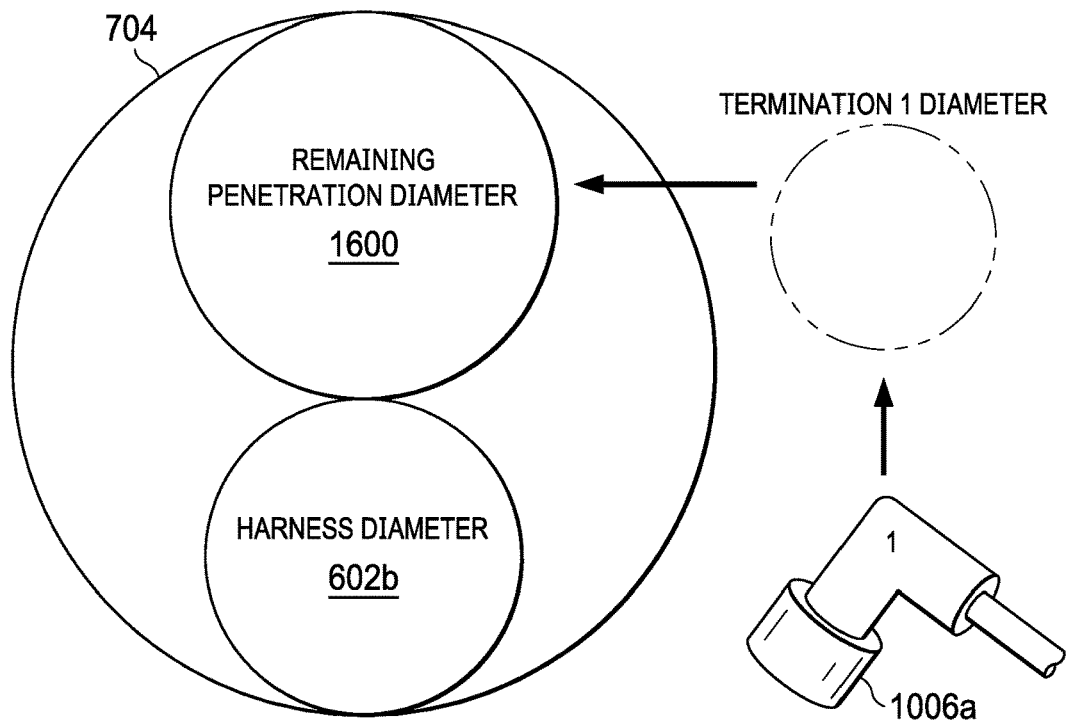
FIG. 17 depicts a visualization of remaining penetration diameter after routing of the first harness and relative to second harness connector diameter in accordance with an illustrative embodiment.

FIG. 17 depicts a visualization of remaining penetration diameter after routing of the first harness, and relative to second harness connector diameter in accordance with an illustrative embodiment. As shown in FIG. 17, the remaining penetration diameter 1600 is large enough to accommodate the diameter of connector 1006a.

Figure 18:
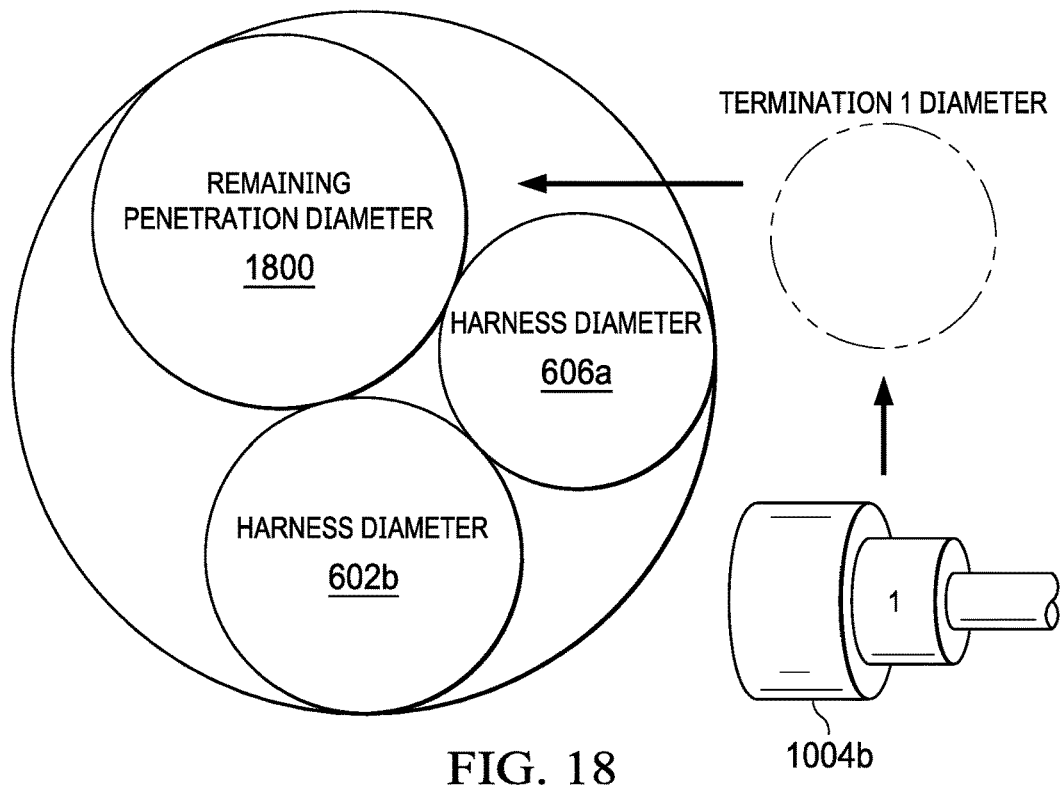
FIG. 18 depicts a visualization of remaining penetration diameter after routing of the second harness and relative to the third harness connector diameter in accordance with an illustrative embodiment.

FIG. 18 depicts a visualization of remaining penetration diameter after routing of the second harness and relative to the third harness connector diameter in accordance with an illustrative embodiment. The combination of first harness branch 602b and second harness branch 606a reduces the remaining penetration diameter to 1800, which has to accommodate connector 1004b of harness branch 604b.

Figure 13:
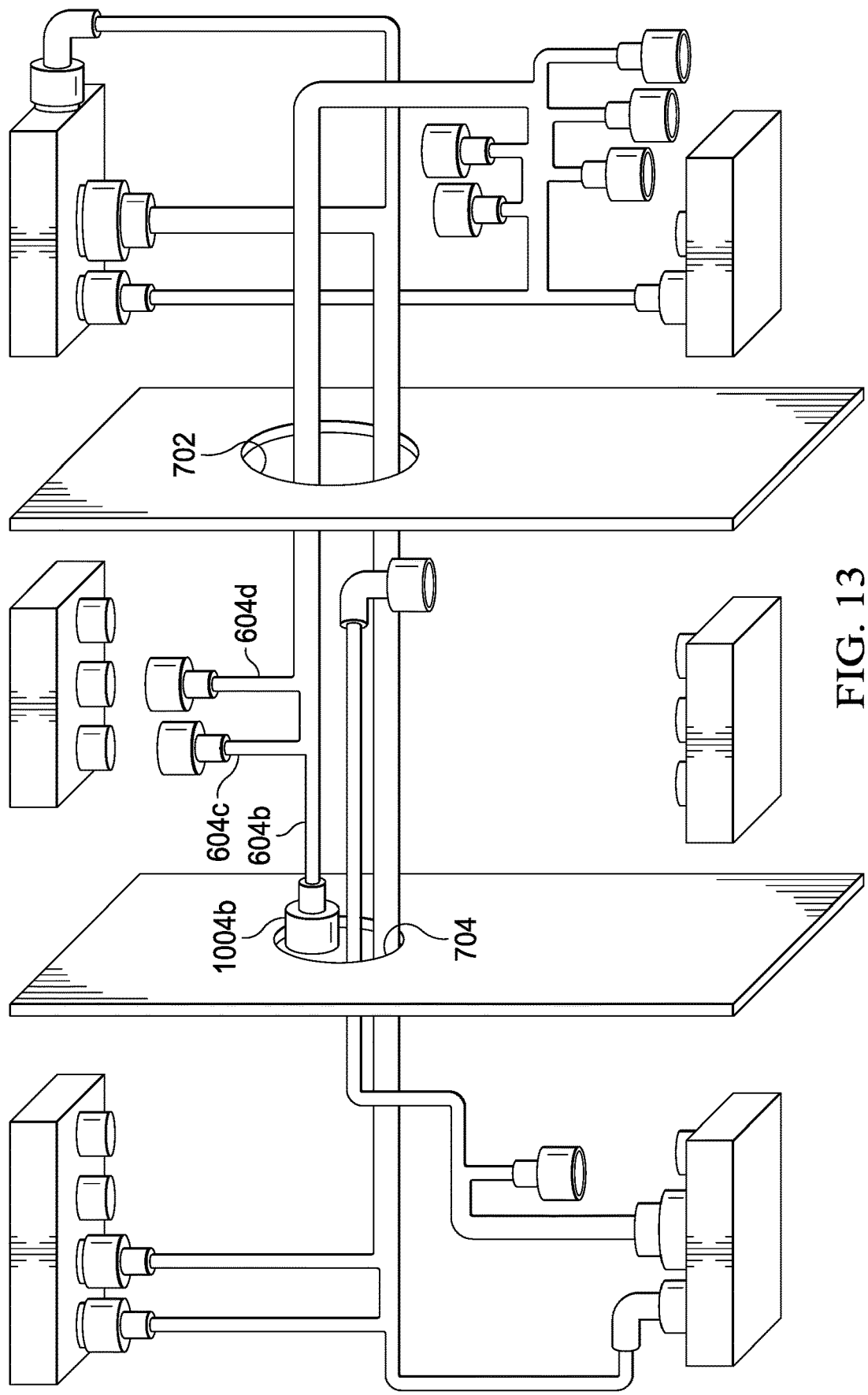
FIG. 13 illustrates installation of the third harness in the multi-system assembly in accordance with an illustrative embodiment.

FIG. 13 illustrates installation of the third harness in the multi-system assembly in accordance with an illustrative embodiment. After routing of termination connector 1006b through penetration 704, the next largest remaining connector is 1004b attached to branch 604b of harness 604.

Branches 604b, 604c, and 604d are first routed through penetration 702. Then branch 604b is routed through remaining diameter 1800 of penetration 704, which is large enough to accommodate termination connector 1004b, as shown in FIG. 18.

In case of a harness that requires multiple terminations routed through a penetration, the sequencing of routing the terminations and related branch diameters have to be considered. The input required is within the system assembly diameter value for branch/segment and relationship with related penetration.

Figure 14:
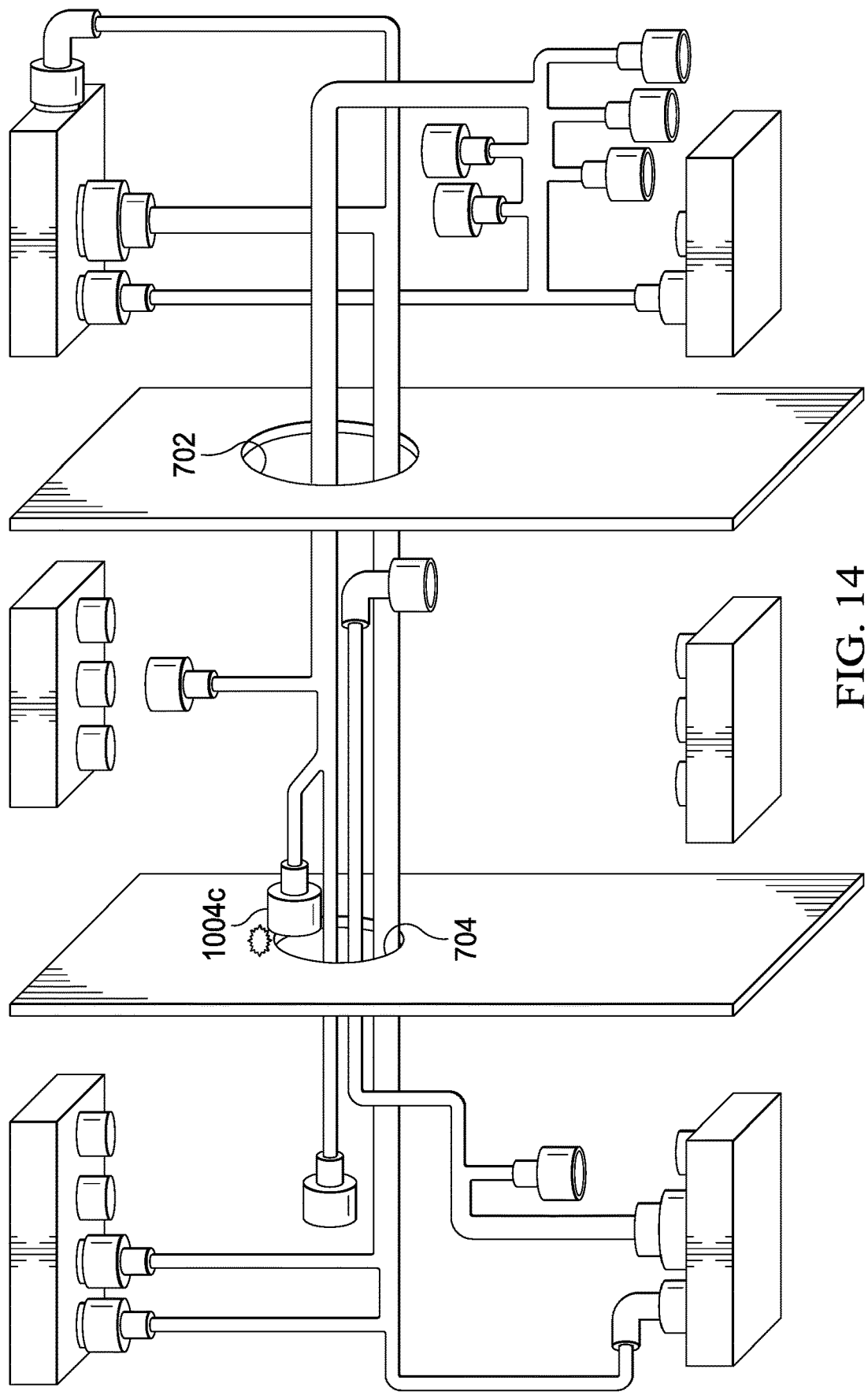
FIG. 14 illustrates a predicted installation problem due to inadequate remaining penetration diameter in accordance with an illustrative embodiment.

FIG. 14 illustrates a predicted installation problem due to inadequate remaining penetration diameter in accordance with an illustrative embodiment. In this example, after installation of branch 604b, the remaining diameter in penetration 704 is too small to accommodate connector 1004c.

Figure 19:
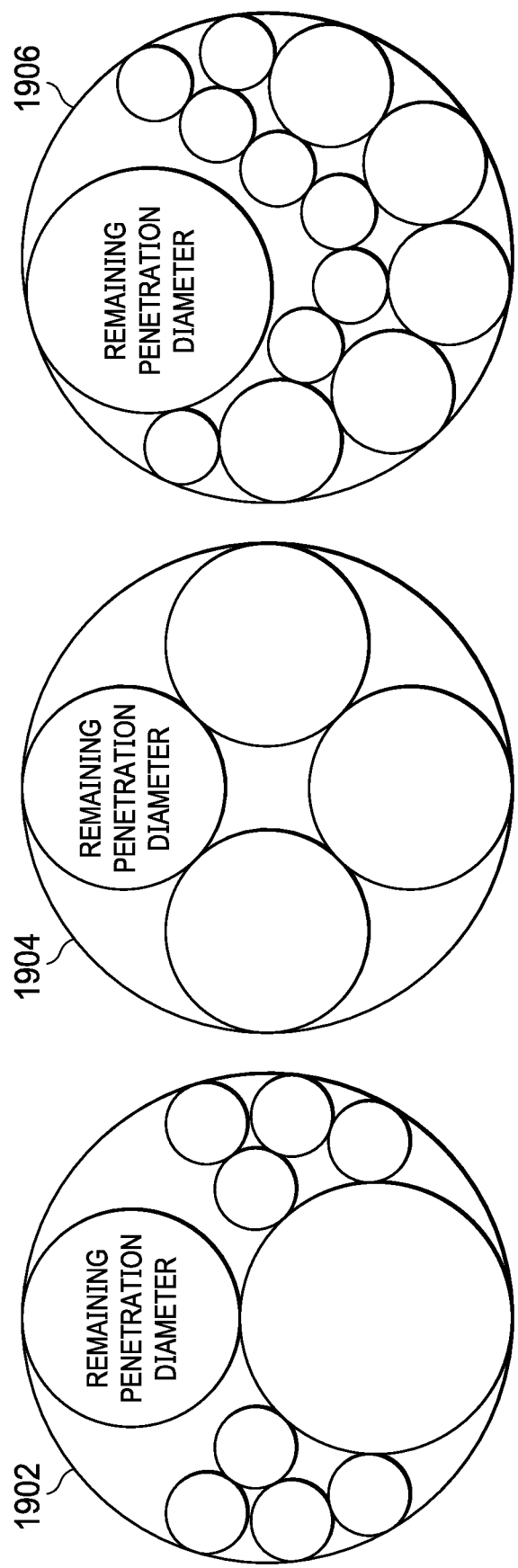
FIG. 19 depicts a visualization of different generalized diameter scenarios in accordance with an illustrative embodiment.

Due to the complexity of the case scenario, the remaining penetration diameter considers all harness diameter value variations. FIG. 19 depicts a visualization of different generalized diameter scenarios. These diameter variations might include, for example, one harness diameter that is significantly greater than other smaller harnesses routed through the same penetration, as shown in scenario 1902. Scenario 1904 illustrates an example of similarly sized harnesses that are relatively large in relation to the penetration diameter. Scenario 1906 illustrates an example of a large number smaller sized harness relative to the penetration diameter, which can be one of the more challenging scenarios to calculate and predict.

Returning to the specific example of FIG. 14, the method of the illustrative embodiment performs a three-option calculation for third harness 604 regarding the remaining space available that is different from that used for second harness 606. The system looks for the lowest value of the three calculation options.

Option 1 transforms the penetration diameter and the diameter of any harness to be routed through it into a surface area. The system calculates the penetration surface area minus the respective harness surface areas, then converts the value back to diameter. This option essentially groups the harnesses into one at a surface area level.

Option 2 simply subtracts the largest diameter of remaining harness from the remaining penetration diameter. This option is best suited to the case where one harness is the significantly larger than any other, such as scenario 1902.

Option 3 is an Écart-type (gap) calculation. This option considers the maximum Écart-type value between all harness diameter combinations, Value A. The maximum harness diameter is multiplied by Ratio A, producing Value B.

Ratio A is a database value, along with Ratio B, based on the quantity of systems (harnesses) within a penetration, as shown in Table 1. The ratios are applicable only starting at two harnesses or more. As shown in Table 1, Ratio A decreases in value as the number of harnesses increases. Conversely, Ratio B increases in value with the number of harness, approximately proportional to Ratio A's decrease.

TABLE 1

| Harness quantity | Ratio A | Ratio B |
| --- | --- | --- |
| 1 | N/A | N/A |
| 2 | 0.88 | 1.1 |
| 3 | 0.7 | 1.2 |
| 4 | 0.65 | 1.3 |
| Etc . . . | | |

Value A is then compared to Value B: Value B−Value A=Value C. If the value A is larger than value C, then the maximum harness diameter is multiplied by Ratio B.

The lowest value of the three options is the worst-case scenario of any potential calculation method, covering any variation of harness size. Therefore, choosing the lowest remaining diameter value (largest calculated allocation for the harness) from among the three options is the safest choice for anticipating potential installation problems.

The three-option calculation enables the identification of potential installation problems due to inadequate penetration diameter, such as shown in FIG. 14, at the design stage. This enables the designers to alter the design or installation sequence in advance. For example, the diameter of penetration 704 can be increased, or the installation procedure might be changed to add termination connector 1004c to branch 604c after the branch 604c has been routed through penetration 704. Typically, such installation problems are not discovered until actual manual installation has begun.

Figure 20:
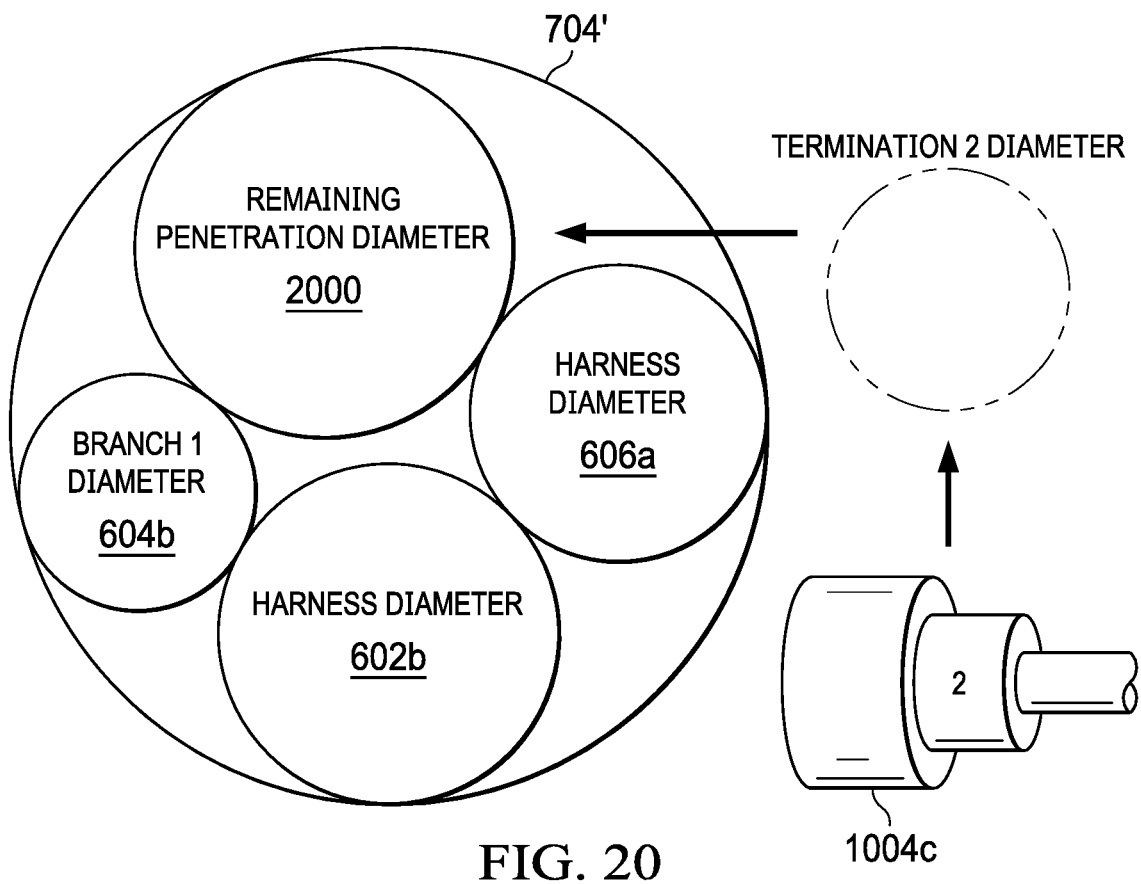
FIG. 20 depicts a visualization of remaining penetration diameter after routing of the third harness and relative to the fourth harness connector diameter in accordance with an illustrative embodiment.

FIG. 20 illustrates a redesigned penetration with sufficient remaining diameter to accommodate remaining harness connectors in accordance with an illustrative embodiment. In this example, penetration 704 has been increased in diameter to 704'. As a result, diameter 2000 remaining penetration after installation of harness branches 602b, 606a, and 604b is large enough to accommodate remaining termination connectors 1004c, 1004d.

FIG. 15 illustrates a complete installation of multi-system assembly 600 in accordance with an illustrative embodiment. With potential installation problems identified and addressed, the final installation sequence and termination number of each harness are determined.

The integration analysis output can be provided in multiple ways. One output can comprise identification of potential problems routing assemblies through penetrations, such as shown in FIG. 14. Another output is an optimized installation sequence within a dedicated penetration.

Table 2 shows an example list of potential installation problems.

TABLE 2

| Penetration | Sequence Item | Analysis Status |
|---|---|---|
| Penetration 2 | Harness 1/termination 1 | Completed |
| Penetration 2 | Harness 1/termination 2 | Completed |
| Penetration 2 | Harness 1/termination 3 | Completed |
| Penetration 2 | Harness 2/termination 1 | Completed |
| Penetration 2 | Harness 3/termination 1 | Completed |
| Penetration 2 | Harness 3/termination 2 | Problem. Termination size is 2.5 while remaining diameter is 2.1 |
| Penetration 2 | Harness 3/termination 3 | Not completed |

Table 2 reflects the example situation shown in FIG. 14. Penetration potential problem is elevated for a dedicated penetration, identifying the specific connector and related harnesses having a potential concern. This output can help the designer to understand if a potential problem exists with installation and make modifications to the design as needed.

Table 3 shows an example installation sequence organized according to harness assembly.

TABLE 3

| Harness assembly name | Termination name | Installation Sequence |
|---|---|---|
| Harness 2 | Termination 2 | Starting point |
| Harness 2 | Termination 1 | Penetration 1 |
| Harness 2 | Termination 3 | Installation pending Harness 1 installation of termination 1, 3, 4 |
| Harness 2 | Termination 3 | Penetration 1 |
| Harness 2 | Termination 1 | Penetration 2 |
| Harness 2 | Termination 3 | Penetration 2 |

In the example in Table 3, the integration analysis output provides a harness view by showing for harness 2 (i.e. harness 606) the associated connector to be used first in the sequence and the termination points and related penetration for subsequent steps. This view can help designer to define and describe the installation sequence of each harness.

Table 4 shows an example installation sequence organized according to penetration.

TABLE 4

| Penetration | Sequence Item |
|---|---|
| Penetration 2 | Harness 1/termination 1 |
| Penetration 2 | Harness 1/termination 2 |
| Penetration 2 | Harness 1/termination 3 |
| Penetration 2 | Harness 2/termination 1 |
| Penetration 2 | Harness 3/termination 1 |
| Penetration 2 | Harness 3/termination 2 |
| Penetration 2 | Harness 3/termination 3 |

In the example in Table 4, the installation sequence is described for a dedicated penetration (i.e. penetration 704) by providing the list of harnesses and their dedicated first connector to be installed in sequence. The sequence in Table 4 matches the sequence in Table 2, but the potential problems have now been addressed.

Figure 21:
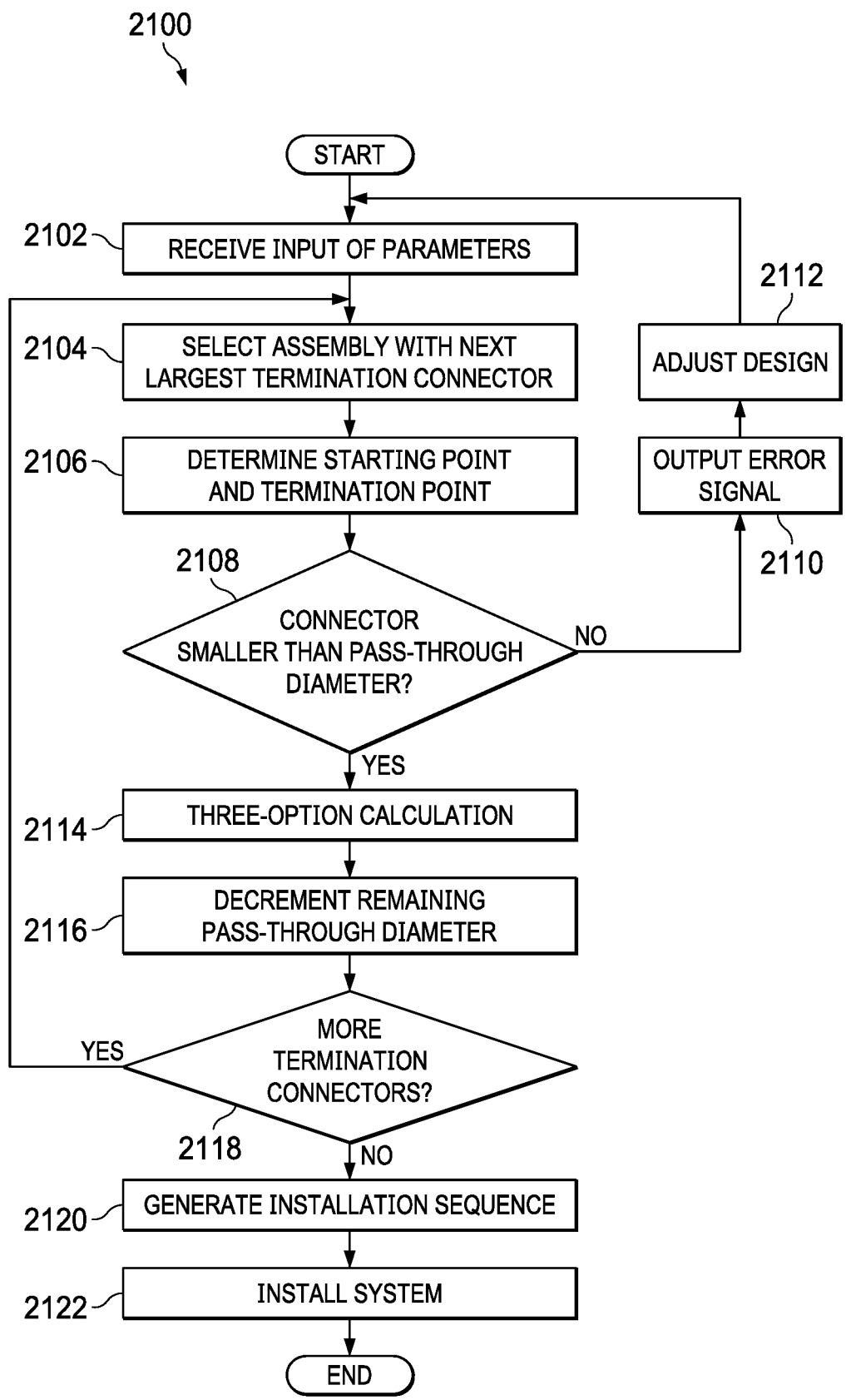
FIG. 21 depicts a flowchart for a process for calculating an optimal system assembly installation and routing sequence in accordance with an illustrative embodiment.

FIG. 21 depicts a flowchart for a process for calculating an optimal system assembly installation and routing sequence in accordance with an illustrative embodiment. Process 2100 in an example of installation planning 130 in FIG. 1 applied to a multi-system harness assembly such as multi-system assembly 600 in FIGS. 8 and 15.

Process 2100 begins by obtaining inputs for a number of parameters (step 2102). These parameters might include an identifier for each system assembly to be installed, its starting point and coordinates, and its final point and coordinates. For each wiring system that traverses a penetration, input might comprise each wiring system's assembly start point coordinates and any wiring system branch terminators that are not required to pass through an identified penetration.

Input parameters further comprise an identifier for each penetration (pass-through opening), its diameter, and coordinates. Input might also comprise an identifier for each wiring system termination connector device, its diameter/size and coordinates. For each wiring system that traverses a pass-thru opening, input includes each wiring system's data transfer element diameter at the point where it passes through each identified pass-thru opening.

Based on the inputs, process 2100 selects wiring system with the largest termination connector diameter for installation analysis (step 2104). From the input data, process 2100 determines the starting point of the harness and the termination point for the termination connector in question (step 2106).

Based on coordinates of wiring system starting point and terminations relative to pass-through coordinates, process 2100 determines if the connector's diameter is smaller than the available diameters of any penetrations through which it will be routed (step 2108).

If the termination connector is not smaller than the available diameters, process 2100 generates an error signal (step 2110). This provides the designer an opportunity to adjust the design according (step 2112) and input the new parameter values.

If the termination connection diameter is smaller than the pass-through diameters, process 2100 uses the three-option calculation to allocate diameter space in related pass-through openings for the harness wiring (step 2114) and decrements the remaining available diameter of any affected pass-through openings accordingly (step 21166).

Process 2100 then determines if there are any more termination connectors in the assembly that need to be analyzed (step 2118). If there are more connectors remaining, process 2100 returns to step 2104 and selected the harness with the next largest terminator connector. The steps are iterated, until all connectors in the system assembly are analyzed or an error signal is generated.

Once all connectors are successfully accounted for, process 2100 generates an optimal installation sequence for the system assembly (step 2120). The system is then installed according to the optimal installation sequence (step 2122).

Figure 22:
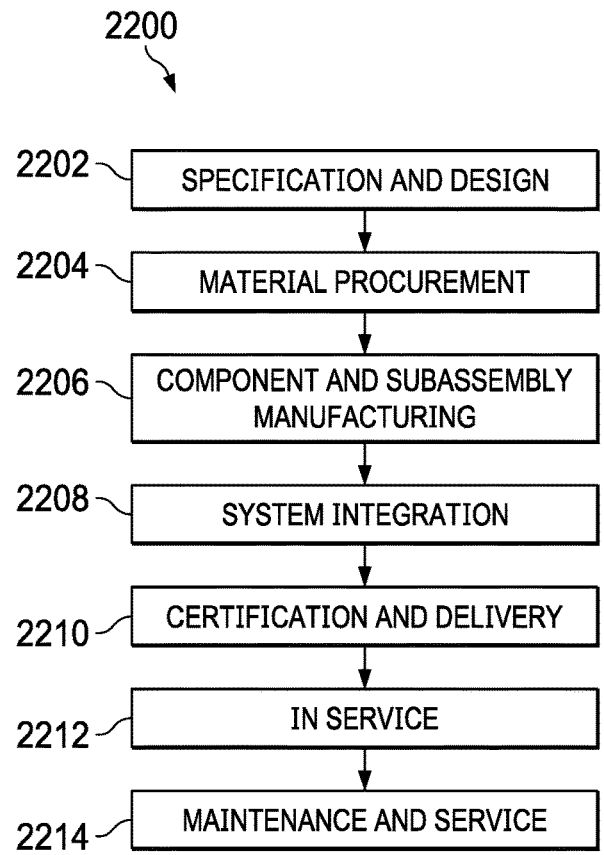
FIG. 22 is an illustration of an aircraft manufacturing and service method in a form of a block diagram in accordance with an illustrative embodiment.
Figure 23:
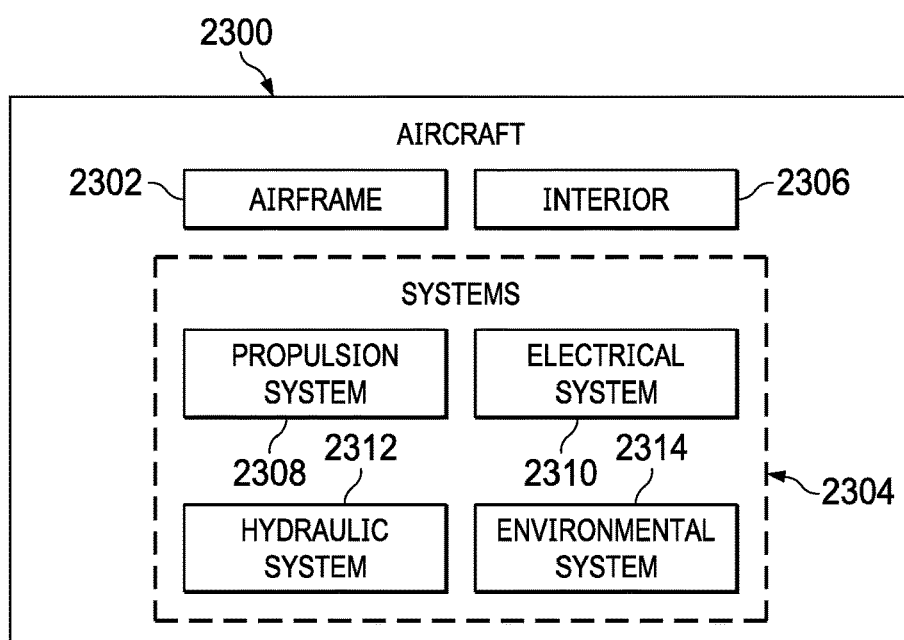
FIG. 23 is an illustration of an aircraft in a form of a block diagram in which an illustrative embodiment may be implemented.

Illustrative embodiments of the present disclosure may be described in the context of aircraft manufacturing and service method 2200 as shown in FIG. 22 and aircraft 2200 as shown in FIG. 23. Turning first to FIG. 22, an illustration of an aircraft manufacturing and service method is depicted in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 takes place. Thereafter, aircraft 2300 may go through certification and delivery 2210 in order to be placed in service 2212. While in service 2212 by a customer, aircraft 2300 is scheduled for routine maintenance and service 2214, which may include modification, reconfiguration, refurbishment, or other maintenance and service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in which an illustrative embodiment may be implemented. In this example, aircraft 2300 is produced by aircraft manufacturing and service method 2200 of FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2200. One or more illustrative embodiments may be manufactured or used during at least one of specification and design 2202 component and subassembly manufacturing 2206, system integration 2208, in service 2212, or maintenance and service 2214 of FIG. 22.

Figure 24:
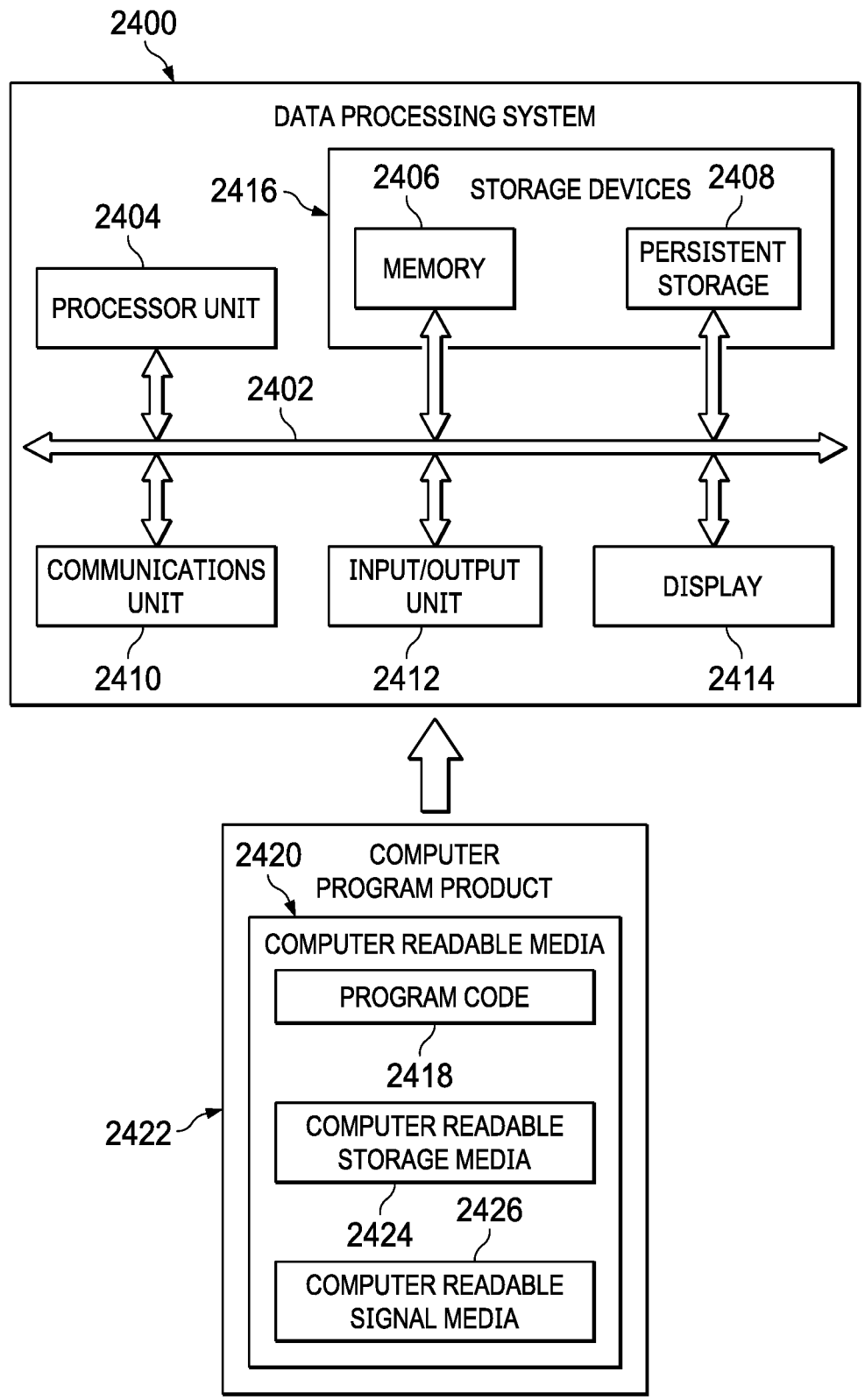
FIG. 24 depicts a block diagram of a data processing system in accordance with an illustrative embodiment.

Turning now to FIG. 24, an illustration of a block diagram of a data processing system is depicted in accordance with an illustrative embodiment. Data processing system might be an example of computer system 100 in FIG. 1. Data processing system 2400 might be used to implement one or more computers to carry out the process steps shown in FIG. 21. In this illustrative example, data processing system 2400 includes communications framework 2402, which provides communications between processor unit 2404, memory 2406, persistent storage 2408, communications unit 2410, input/output unit 2412, and display 2414. In this example, communications framework 2402 may take the form of a bus system.

Processor unit 2404 serves to execute instructions for software that may be loaded into memory 2406. Processor unit 2404 may be a number of processors, a multi-processor core, or some other type of processor, depending on the particular implementation. In an embodiment, processor unit 2404 comprises one or more conventional general purpose central processing units (CPUs). In an alternate embodiment, processor unit 2404 comprises a number of graphical processing units (CPUs).

Memory 2406 and persistent storage 2408 are examples of storage devices 2416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2416 may also be referred to as computer-readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 also may be removable. For example, a removable hard drive may be used for persistent storage 2408. Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through at least one of a keyboard, a mouse, or some other suitable input device. Further, input/output unit 2412 may send output to a printer. Display 2414 provides a mechanism to display information to a user.

Instructions for at least one of the operating system, applications, or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer-usable program code, or computer-readable program code that may be read and executed by a processor in processor unit 2404. The program code in the different embodiments may be embodied on different physical or computer-readable storage media, such as memory 2406 or persistent storage 2408.

Program code 2418 is located in a functional form on computer-readable media 2420 that is selectively removable and may be loaded onto or transferred to data processing system 2400 for execution by processor unit 2404. Program code 2418 and computer-readable media 2420 form computer program product 2422 in these illustrative examples. In one example, computer-readable media 2420 may be computer-readable storage media 2424 or computer-readable signal media 2426.

In these illustrative examples, computer-readable storage media 2424 is a physical or tangible storage device used to store program code 2418 rather than a medium that propagates or transmits program code 2418. Alternatively, program code 2418 may be transferred to data processing system 2400 using computer-readable signal media 2426.

Computer-readable signal media 2426 may be, for example, a propagated data signal containing program code 2418. For example, computer-readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method for determining an installation sequence for a system assembly comprising a number of system branches attached to respective terminations, the method comprising:
   receiving, by the number of processors, schematics for a product into which the system assembly is to be installed, wherein the product comprises a number of penetration openings;
   identifying from the system assembly, by the number of processors, a largest termination intended to pass through one of the penetration openings and comparing a diameter of the largest termination to a diameter of the penetration opening;
   if the diameter of the largest termination is larger than the diameter of the penetration opening, generating, by the number of processors, an error signal for the termination;
   if the diameter of the largest termination is smaller than the diameter of the penetration opening, decrementing, by the number of processors, the diameter of the penetration opening by a diameter of the system branch attached to the largest termination and adding the largest termination as a step in the installation sequence; and
   iteratively identifying, by the number of processors, a next largest termination in the system assembly intended to pass through the penetration opening, comparing a diameter of the next largest termination to the decremented diameter of the penetration opening, and further decrementing the diameter of the penetration opening until an error signal is generated for a termination or all terminations in the system assembly intended to pass through the penetration opening are added as steps in the installation sequence; and
   installing the system assembly according to the installation sequence.

2. The method of claim 1, wherein determining if a termination is intended to pass through a penetration comprises comparing specified connection coordinates for each system branch to specified coordinates for each penetration opening in the schematics.

3. The method of claim 1, further comprising, in response to an error signal:
   receiving a number of revisions to the schematics; and
   repeating comparison of the termination diameter to the penetration diameter according to the revisions to the schematics.

4. The method of claim 1, wherein the diameter of the penetration opening is decremented according to a multi-option calculation to allocate space for the system branch diameter, and wherein a largest allocation for the system branch is selected from among the options.

5. The method of claim 1, further comprising:
identifying from the schematics a starting connection coordinate for the system assembly; and
based on the starting connection coordinate, disregarding any connection that has termination coordinate on the same side of a penetration opening as the starting connection coordinate.

6. The method of claim 1, further comprising generating an installation sequence organized according to system branches.

7. The method of claim 1, further comprising generating an installation sequence organized according penetration openings.

8. The method of claim 1, wherein the system assembly comprises a wiring harness assembly, and wherein the terminations comprise connector devices.

9. A system for determining an installation sequence for a system assembly comprising a number of system branches attached to respective terminations, the system comprising:
a bus system;
a storage device connected to the bus system, wherein the storage device stores program instructions; and
a number of processors connected to the bus system, wherein the number of processors execute the program instructions to:
receive schematics for a product into which the system assembly is to be installed, wherein the product comprises a number of penetration openings;
identify from the system assembly a largest termination intended to pass through one of the penetration openings and comparing a diameter of the largest termination to a diameter of the penetration opening;
if the diameter of the largest termination is larger than the diameter of the penetration opening, generate an error signal for the termination;
if the diameter of the largest termination is smaller than the diameter of the penetration opening, decrement the diameter of the penetration opening by a diameter of the system branch attached to the largest termination and adding the largest termination as a step in the installation sequence; and
iteratively identify a next largest termination in the system assembly intended to pass through the penetration opening, compare a diameter of the next largest termination to the decremented diameter of the penetration opening, and further decrement the diameter of the penetration opening until an error signal is generated for a termination or all terminations in the system assembly intended to pass through the penetration opening are added as steps in the installation sequence; and
install the system assembly according to the installation sequence.

10. The system of claim 9, wherein to determine if a termination is intended to pass through a penetration, the processors further execute instructions to compare specified connection coordinates for each system branch to specified coordinates for each penetration opening in the schematics.

11. The system of claim 9, wherein, in response to an error signal, the processors further execute instructions to:
receive a number of revisions to the schematics; and
repeat comparison of the termination diameter to the penetration diameter according to the revisions to the schematics.

12. The system of claim 9, wherein the diameter of the penetration opening is decremented according to a multi-option calculation to allocate space for the system branch diameter, and wherein a largest allocation for the system branch is selected from among the options.

13. The system of claim 9, wherein the processors further execute instructions to:
identify from the schematics a starting connection coordinate for the system assembly; and
based on the starting connection coordinate, disregard any connection that has termination coordinate on the same side of a penetration opening as the starting connection coordinate.

14. The system of claim 9, wherein the processors further execute instructions to generate an installation sequence organized according to system branches.

15. The system of claim 9, generate an installation sequence organized according penetration openings.

16. The system of claim 9, wherein the system assembly comprises a wiring harness assembly, and wherein the terminations comprise connector devices.

17. A computer program product for determining an installation sequence for a system assembly comprising a number of system branches attached to respective terminations, the computer program product comprising:
a non-volatile computer readable storage medium having program instructions embodied therewith, the program instructions executable by a number of processors to cause a number of computers to perform the steps of:
receiving schematics for a product into which the system assembly is to be installed, wherein the product comprises a number of penetration openings;
identifying from the system assembly a largest termination intended to pass through one of the penetration openings and comparing a diameter of the largest termination to a diameter of the penetration opening;
if the diameter of the largest termination is larger than the diameter of the penetration opening, generating an error signal for the termination;
if the diameter of the largest termination is smaller than the diameter of the penetration opening, decrementing the diameter of the penetration opening by a diameter of the system branch attached to the largest termination and adding the largest termination as a step in the installation sequence; and
iteratively identifying a next largest termination in the system assembly intended to pass through the penetration opening, comparing a diameter of the next largest termination to the decremented diameter of the penetration opening, and further decrementing the diameter of the penetration opening until an error signal is generated for a termination or all terminations in the system assembly intended to pass through the penetration opening are added as steps in the installation sequence; and
installing the system assembly according to the installation sequence.

18. The computer program product of claim 17, wherein determining if a termination is intended to pass through a penetration comprises comparing specified connection coordinates for each system branch to specified coordinates for each penetration opening in the schematics.

19. The computer program product of claim 17, further comprising, in response to an error signal, instructions for:
receiving a number of revisions to the schematics; and repeating comparison of the termination diameter to the penetration diameter according to the revisions to the schematics.

20. The computer program product of claim 17, wherein the diameter of the penetration opening is decremented according to a multi-option calculation to allocate space for the system branch diameter, and wherein a largest allocation for the system branch is selected from among the options.

21. The computer program product of claim 17, further comprising instructions for:
- identifying from the schematics a starting connection coordinate for the system assembly; and
- based on the starting connection coordinate, disregarding any connection that has termination coordinates on the same side of a penetration opening as the starting connection coordinate.

22. The computer program product of claim 17, further comprising instructions for generating an installation sequence organized according to system branches.

23. The computer program product of claim 17, further comprising instructions for generating an installation sequence organized according penetration openings.

24. The computer program product of claim 17, wherein the system assembly comprises a wiring harness assembly, and wherein the terminations comprise connector devices.

\* \* \* \* \*

UNITED STATES PATENT AND TRADEMARK OFFICE
CERTIFICATE OF CORRECTION

PATENT NO. : 11,392,113 B2
APPLICATION NO. : 16/735966
DATED : July 19, 2022
INVENTOR(S) : Guillaume Jean-Baptiste Laurent It is certified that error appears in the above-identified patent and that said Letters Patent is hereby corrected as shown below:

In the Claims

Column 16, Line 22, correct "the number of processors" to read -- a number of processors --

Signed and Sealed this
Twenty-ninth Day of November, 2022

Katherine Kelly Vidal
*Director of the United States Patent and Trademark Office*